Sept. 5, 1961   L. A. PAZANDAK   2,998,674
APPARATUS FOR MOUNTING TREES IN STANDS THEREFOR
Filed March 30, 1960   14 Sheets-Sheet 1
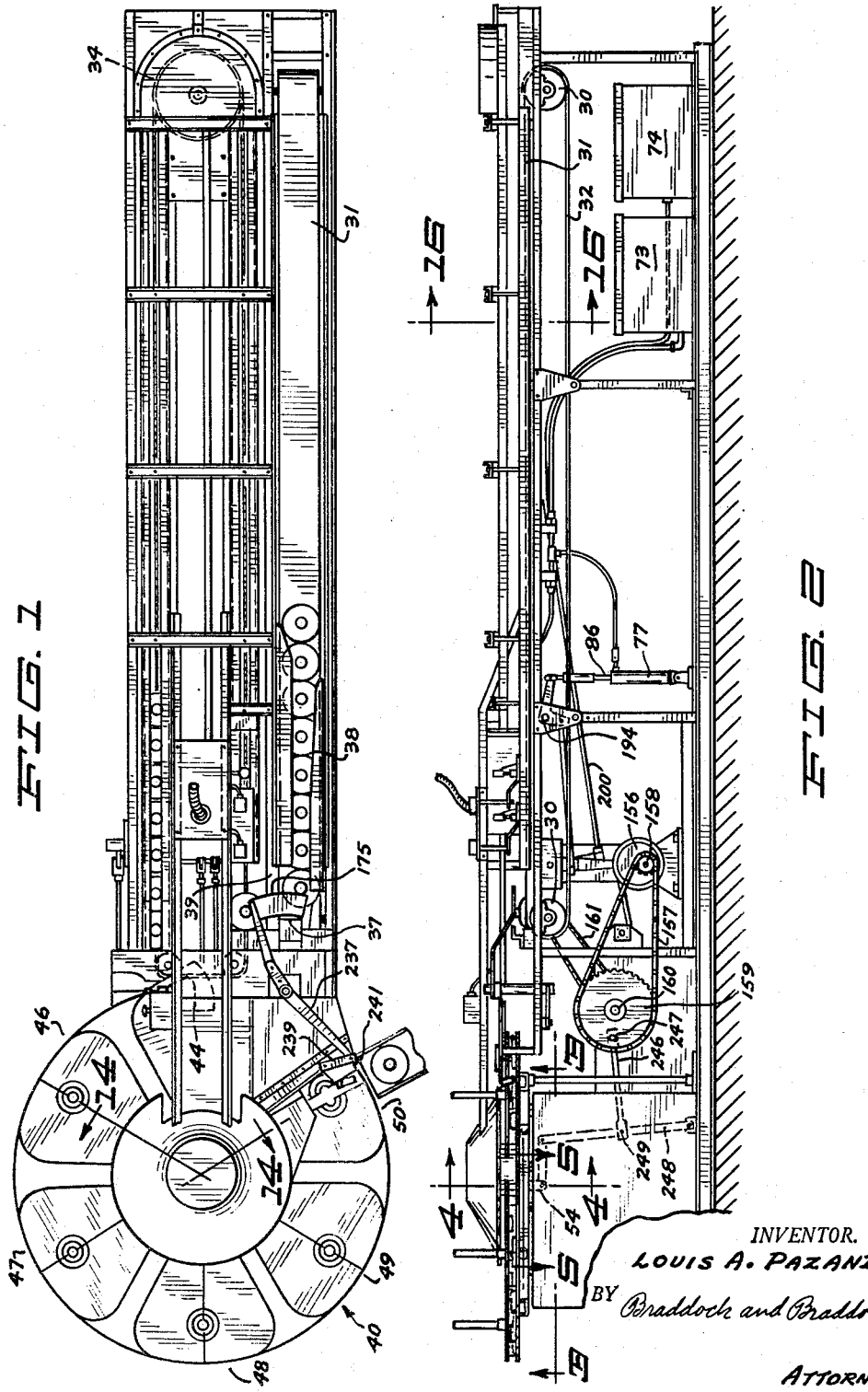
INVENTOR.
LOUIS A. PAZANDAK
BY Braddock and Braddock
ATTORNEYS

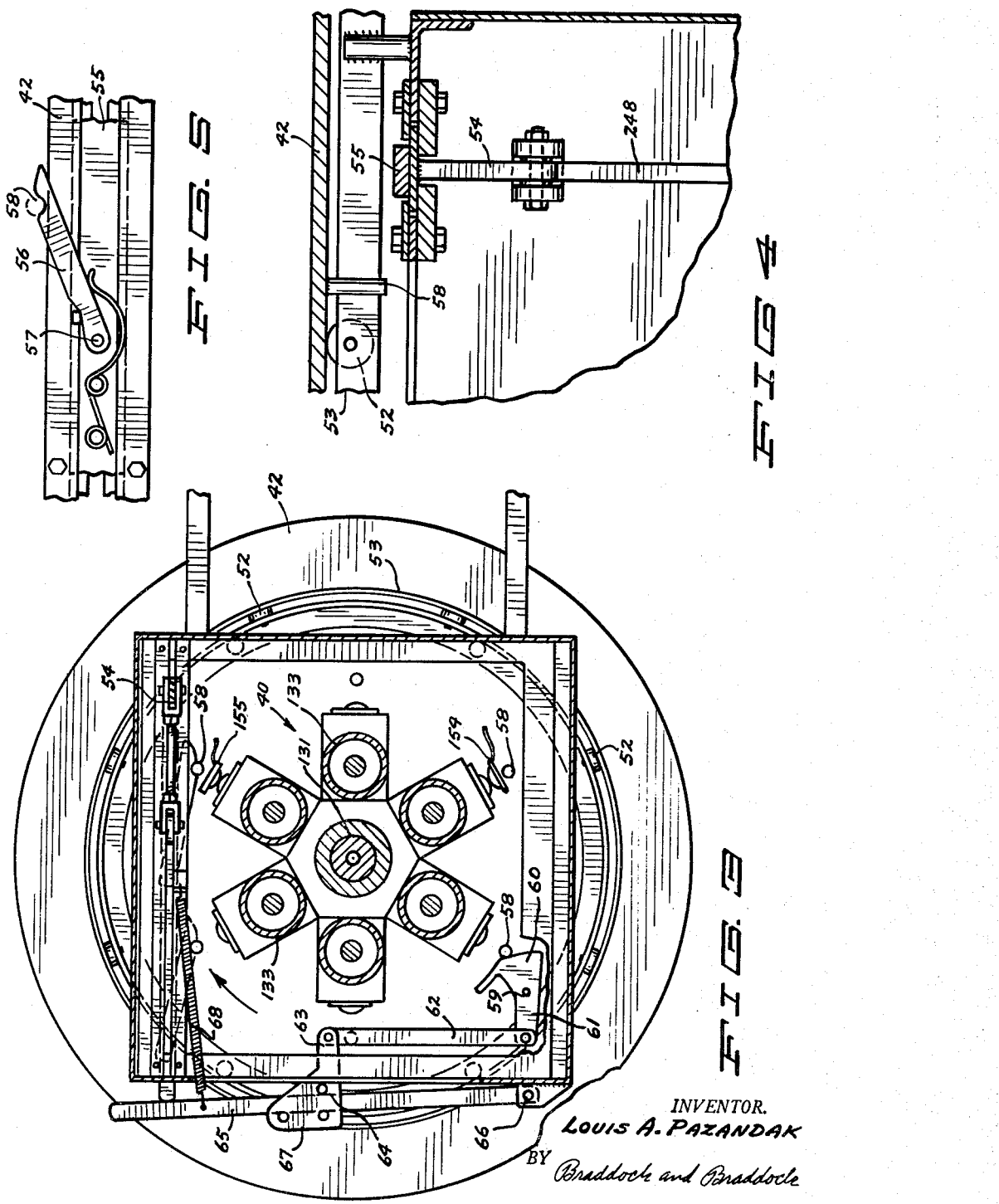

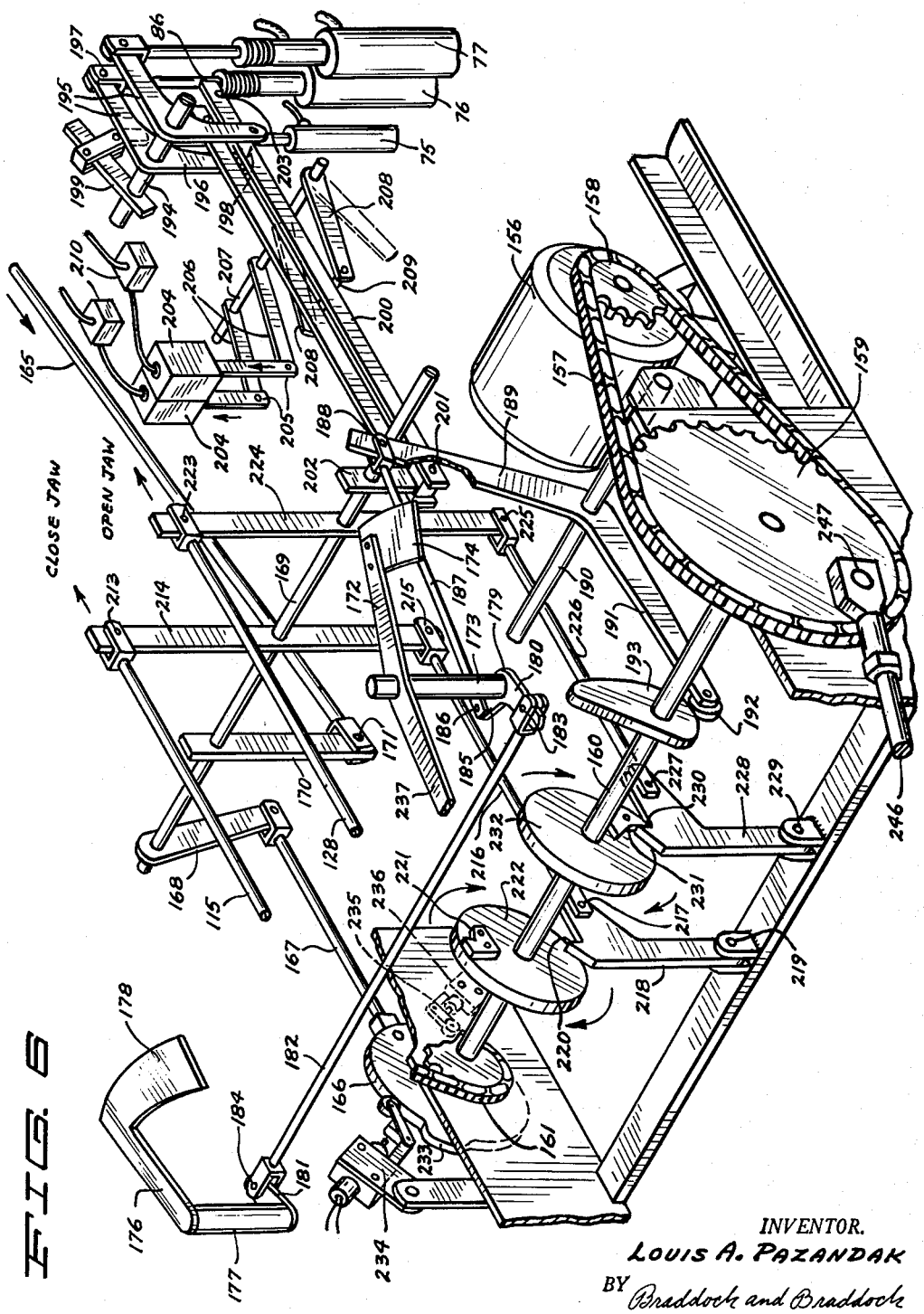

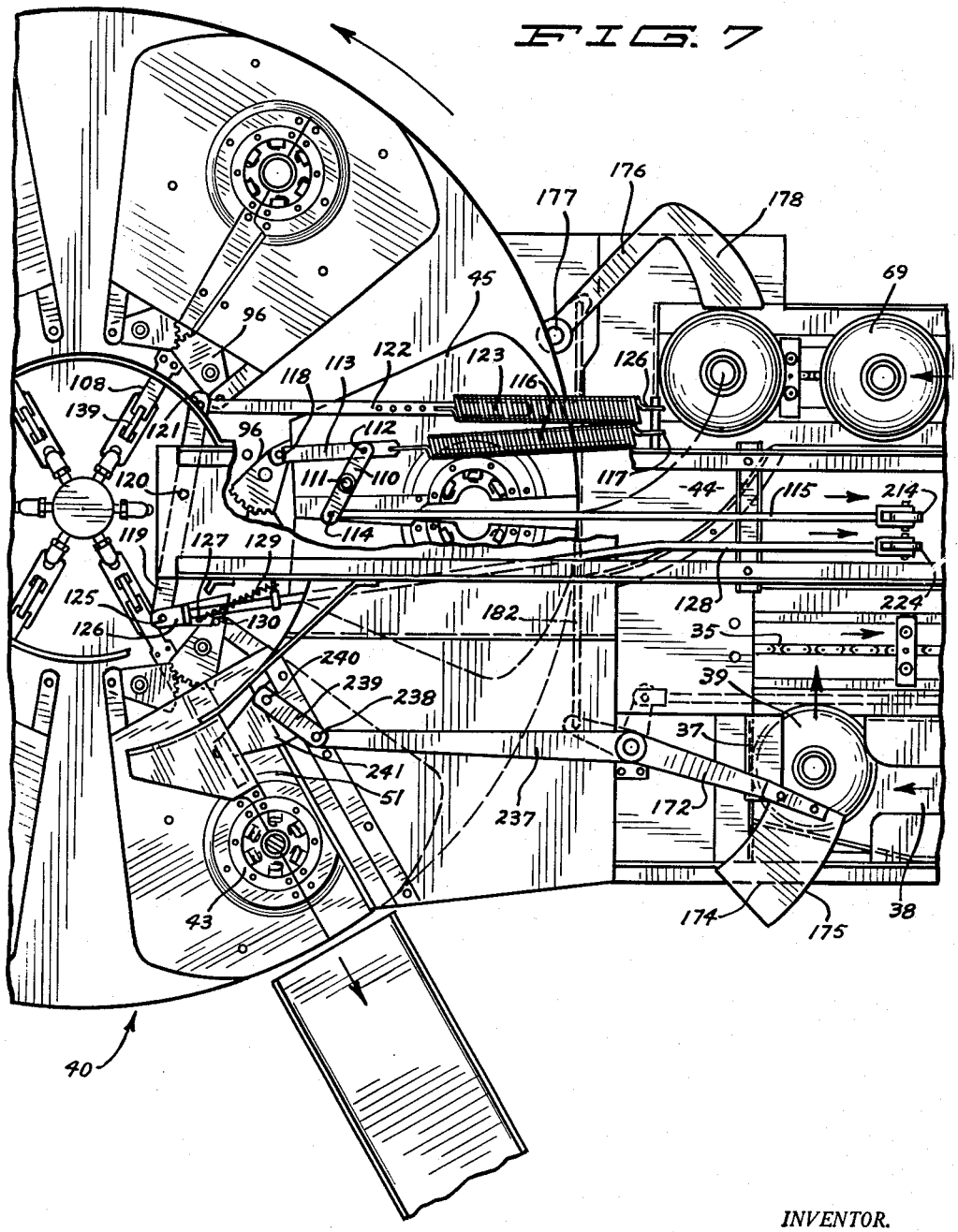

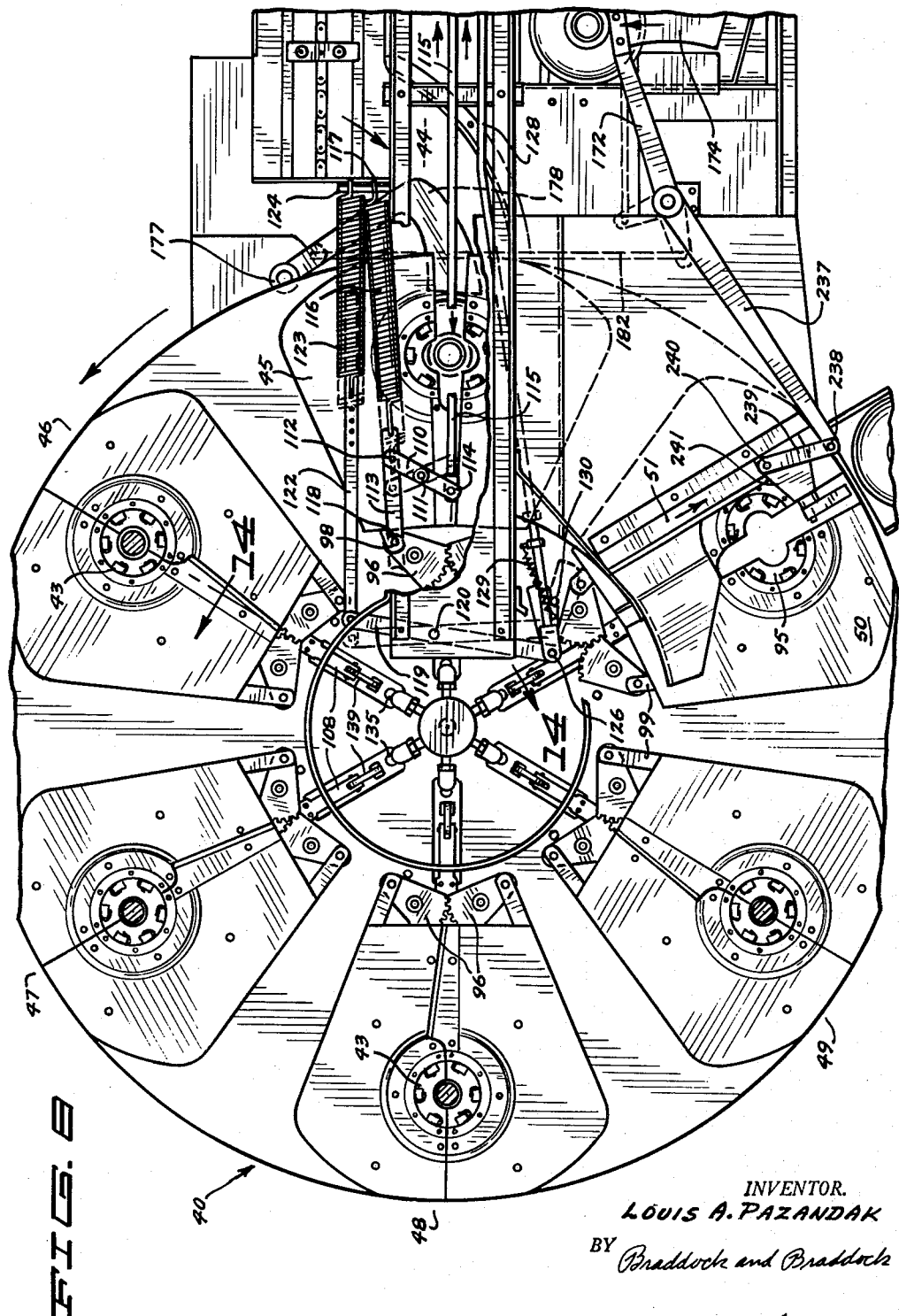

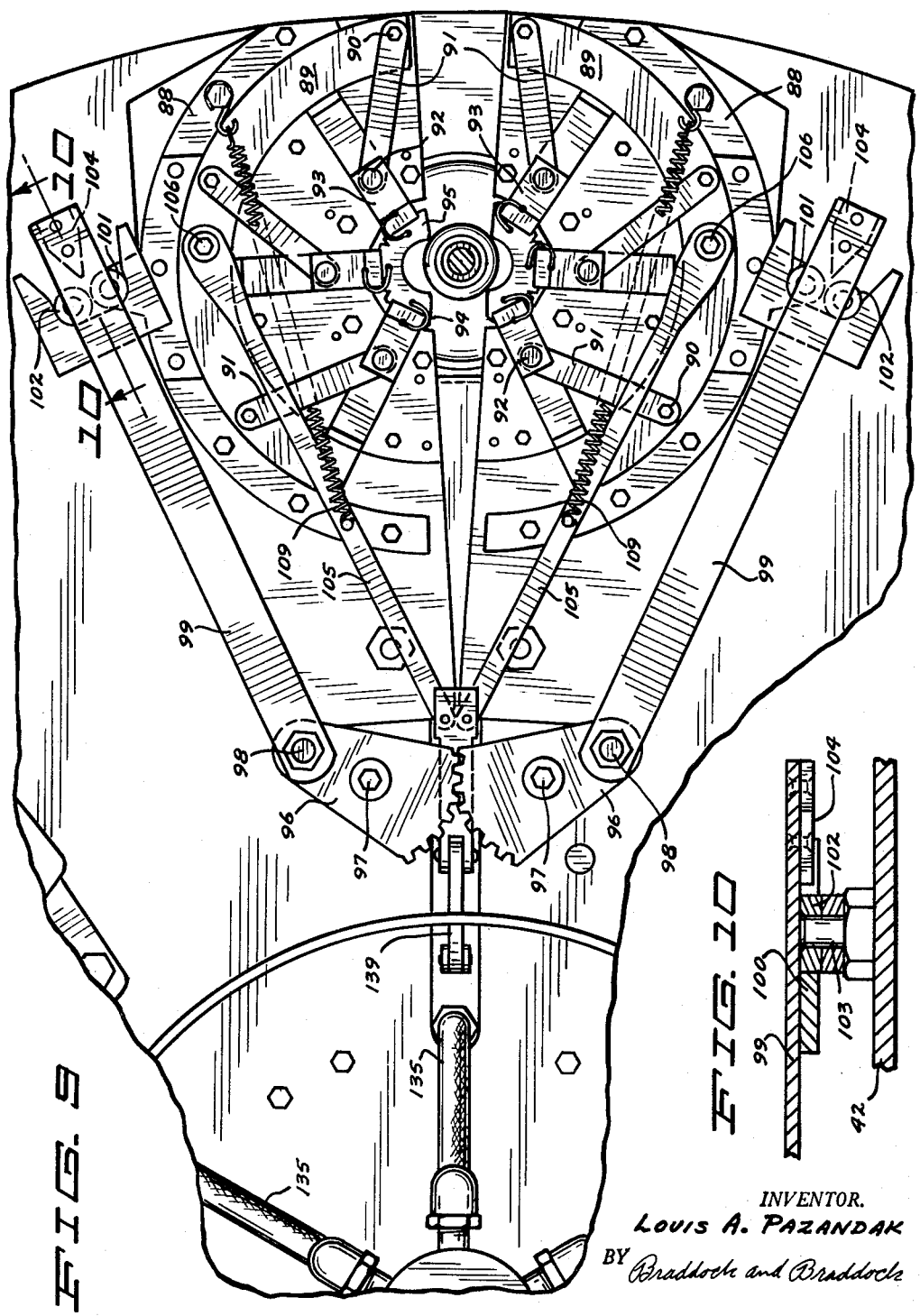

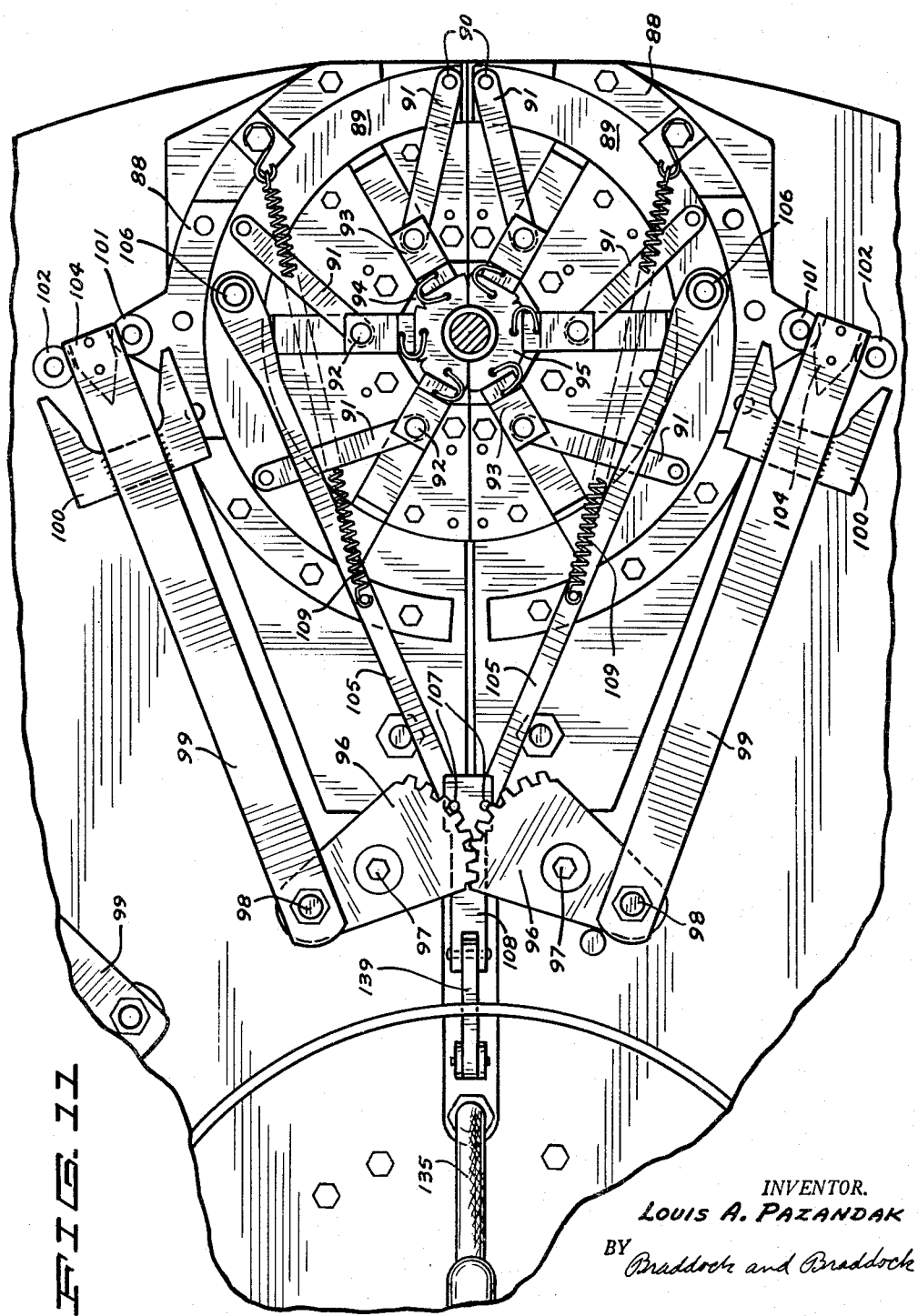

Sept. 5, 1961  L. A. PAZANDAK  2,998,674
APPARATUS FOR MOUNTING TREES IN STANDS THEREFOR
Filed March 30, 1960  14 Sheets-Sheet 8

INVENTOR.
LOUIS A. PAZANDAK
BY Braddock and Braddock
ATTORNEYS

Sept. 5, 1961  L. A. PAZANDAK  2,998,674
APPARATUS FOR MOUNTING TREES IN STANDS THEREFOR
Filed March 30, 1960  14 Sheets-Sheet 10

INVENTOR.
LOUIS A. PAZANDAK
BY Braddock and Braddock
ATTORNEYS

Sept. 5, 1961 L. A. PAZANDAK 2,998,674
APPARATUS FOR MOUNTING TREES IN STANDS THEREFOR
Filed March 30, 1960 14 Sheets-Sheet 12

INVENTOR.
LOUIS A. PAZANDAK
BY Braddock and Braddock
ATTORNEYS

Sept. 5, 1961      L. A. PAZANDAK      2,998,674
APPARATUS FOR MOUNTING TREES IN STANDS THEREFOR
Filed March 30, 1960      14 Sheets-Sheet 13

INVENTOR.
LOUIS A. PAZANDAK
BY Braddock and Braddock
ATTORNEYS

Sept. 5, 1961 L. A. PAZANDAK 2,998,674
APPARATUS FOR MOUNTING TREES IN STANDS THEREFOR
Filed March 30, 1960 14 Sheets-Sheet 14
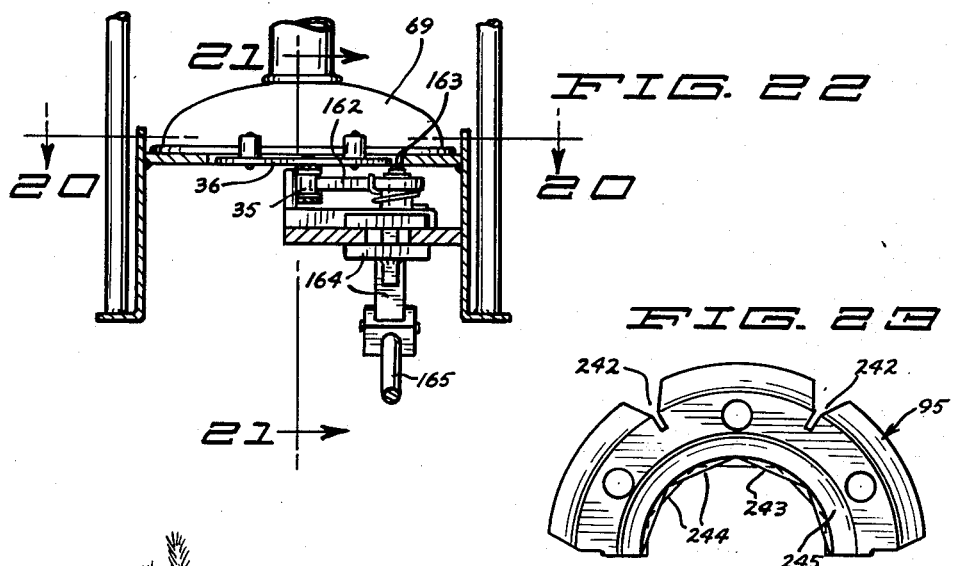
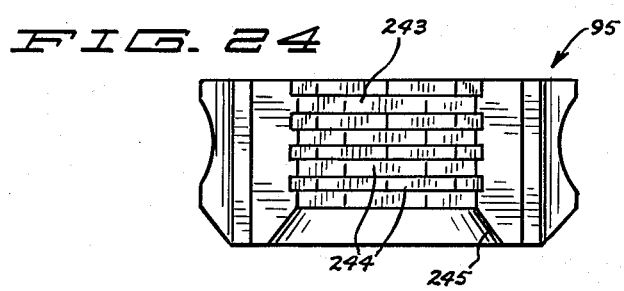
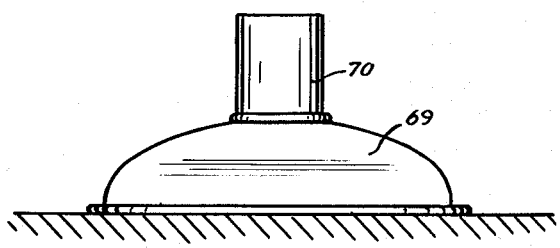
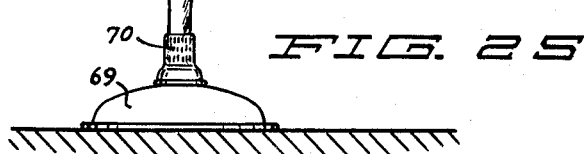
INVENTOR.
LOUIS A. PAZANDAK
BY Braddock and Braddock
ATTORNEYS > United States Patent Office
2,998,674
Patented Sept. 5, 1961

1

2,998,674
APPARATUS FOR MOUNTING TREES IN STANDS THEREFOR
Louis A. Pazandak, Minneapolis, Minn., assignor to Halvorson Trees, Inc., Duluth, Minn., a corporation of Minnesota
Filed Mar. 30, 1960, Ser. No. 18,766
15 Claims. (Cl. 47—1)

The invention herein has relation to a novel and improved apparatus for mounting trees in hollow stands therefor, the apparatus including mechanism for accomplishing various operations on the stands, such as supplying each hollow stand with water and/or liquid plant food and constricting a collar of each hollow stand upon and about the trunk of a tree to be assembled therewith in such manner that the tree will be grasped in the hollow stand for an indefinitely long period of time and liquid within the stand will be precluded from becoming removed therefrom save by capillary attraction up along the tree trunk, regardless of whether said hollow stand may be stored for a long period in reclining position or in upright position at right angle or other relation to a supporting surface for the hollow stand with tree.

In accordance with the invention, a plurality of hollow stands, each consisting of a base member having an upwardly extending collar thereon, are simultaneously successively conveyed, one after another by stages, first to a station or stations where a metered quantity of water and/or nutrient are added and thence through an elongated heater in which collars of the hollow stands are heated sufficiently to render them capable of being readily deformable by pressure. Thence the hollow stands are fed, one after another in stages, successively into a rotatable assembly for advancing each hollow stand, step by step in stages, to each of different stations. The rotatable assembly supports a plurality of equally circumferentially spaced constricting mechanisms and the hollow stands are successively fed individually one after another to position within one or another of said constricting mechanisms. That is, each hollow stand is fed to one of several different constricting mechanisms by which to be operated upon while the constricting mechanism is at an initial station of the rotatable assembly. Succeeding stations, respectively, of said rotatable assembly are at locations where each hollow stand is to receive a tree upon which a heated collar of the stand is to be constricted and where the corresponding constricting mechanism is to be actuated to cause the collar of the hollow stand to be sealingly grasped upon the trunk of the tree which was inserted therein. Each of the constricting mechanisms, together with the corresponding hollow stand and the tree on which said hollow stand is constricted, is advanced through successive stages from the collar constricting station toward and to a final station where the constricting mechanism is released. Successive stage advancement of each of the hollow stands from the location where its heated collar is constricted on a tree trunk to the final station where said constricting mechanism is released is for the purpose of affording each stand and its collar time to cool and become set before being released from constriction. Each united hollow stand-tree is ejected from the apparatus following release of the collar of the hollow stand from the constricting mechanism by which said hollow stand and tree were cause to be assembled together.

Each of the equally circumferentially spaced constricting mechanisms operates in the manner as hereinbefore stated. That is, each of said mechanisms is rotated step by step, receives a hollow stand at the initial station and is operative upon the hollow stand in the manner as set forth to cause it to be constricted upon a tree trunk and ejected from the apparatus. In practical use of the apparatus, operation is on several different trees simultaneously. Stated differently, while a rearwardmost one of the constricting mechanisms is at the initial station to receive one of the tree stands, the next adjacent advanced constricting mechanism will be situated where to receive and be constricted on a tree, there will be a tree grasped in a constricting mechanism at the final station ready to be released, and there will be several of the hollow stands becoming cooled at locations between the station where each collar receives and is constricted upon a tree and the final station where to be released.

In my United States Letters Patent No. 2,838,789, for Method of and Machine for Constricting Collars Onto Shafts, granted June 17, 1958, there is disclosed an apparatus constructed to be capable of constricting only one collar at a time upon a tree trunk. In the instance of an apparatus made according to said patent, once a hollow stand is inserted several operations upon the stand constricting it onto a tree have to be completed before a different stand to receive another tree can be inserted and operated upon. Necessarily, each of the successive operations on each collar, including cooling thereof, have to be performed separately. The present invention, which contemplates the performance simultaneously of different assembling operations on each of several different hollow stand-trees, was devised to increase the output.

The apparatus herein illustrated and described incorporates features and characteristics which are improvements over the disclosure of my above identified patent.

In the accompanying drawings forming a part of this specification,

FIG. 1 is a top plan view, parts being omitted, of an apparatus made according to the invention capable of being employed in the accomplishment of steps of the novel and improved method;

FIG. 2 is a side elevational view of the apparatus;

FIG. 3 is an enlarged horizontal sectional view, taken on line 3—3 in FIG. 2, with parts in different positions;

FIG. 4 is an enlarged sectional view, taken on line 4—4 in FIG. 2;

FIG. 5 is a fragmentary top plan view of a portion of an indexing mechanism of the apparatus as it would appear from the position indicated by line 5—5 in FIG. 2 with overlying parts broken away;

FIG. 6 is a diagrammatic view disclosing operating linkages, levers, etc. of the apparatus, as well as an actuating motor thereof;

Figure 12:
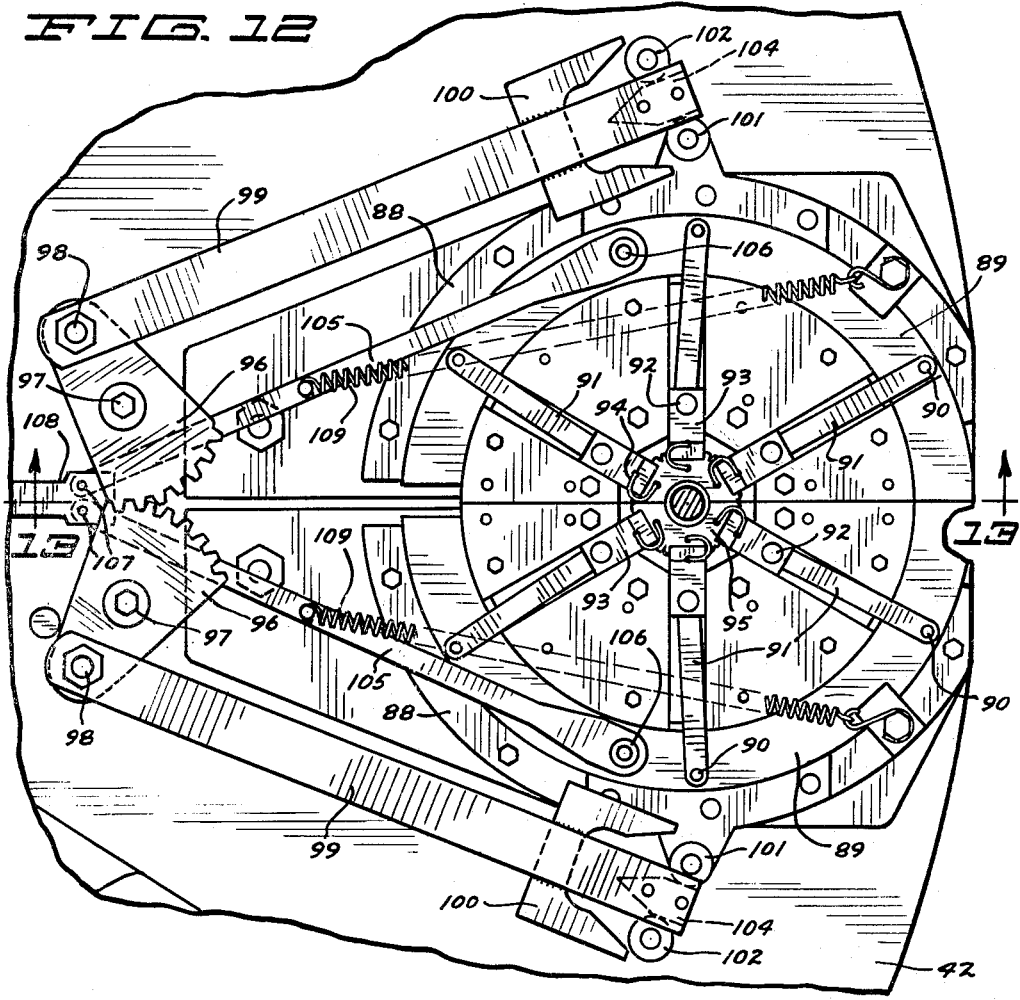
Figure 13:
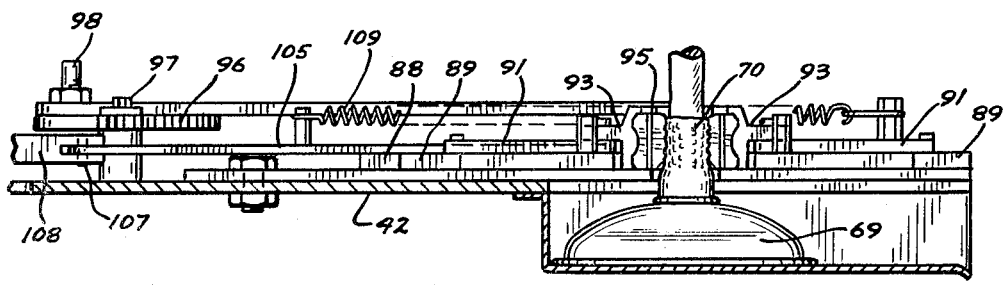
Figure 14:
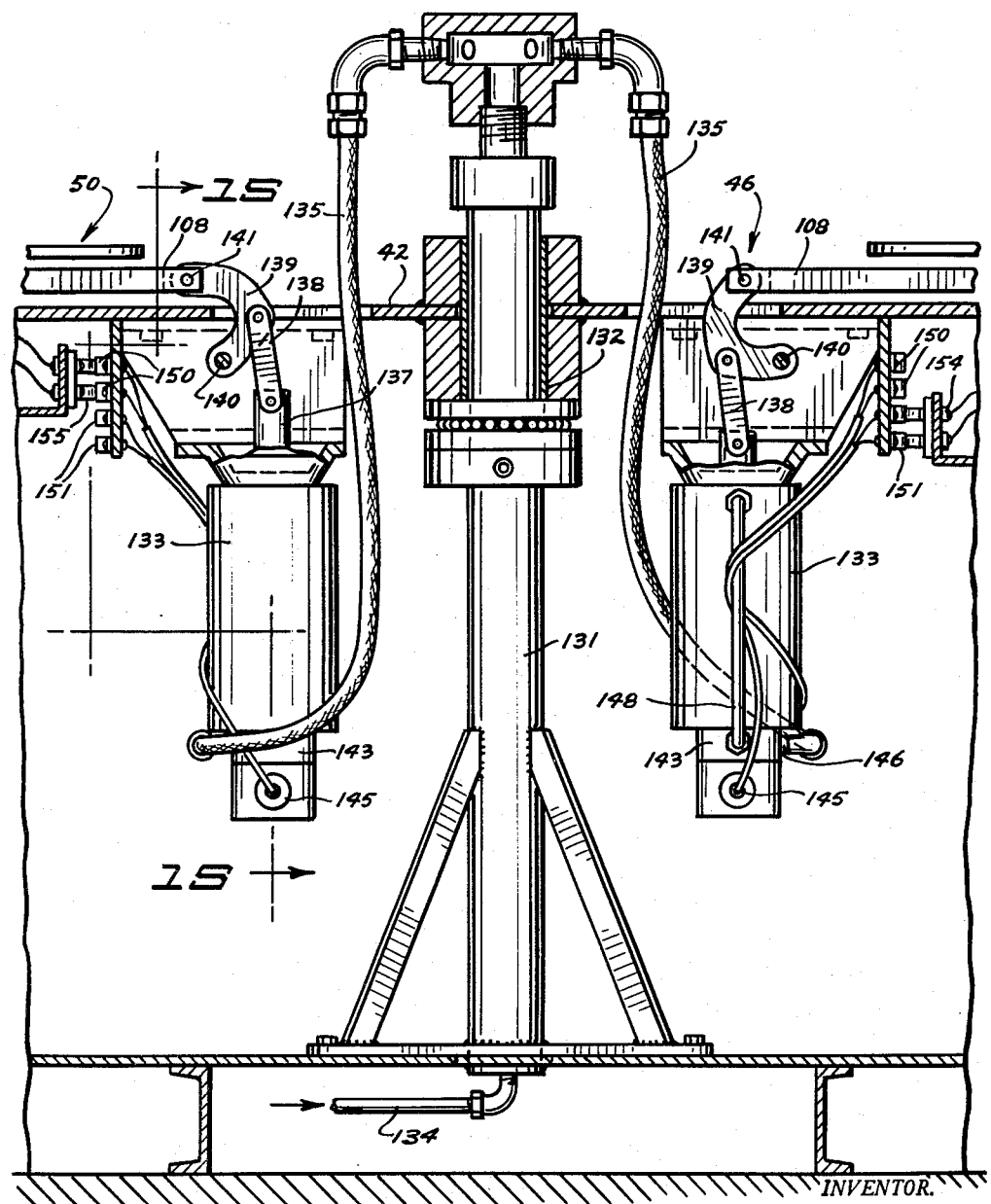
Figure 15:
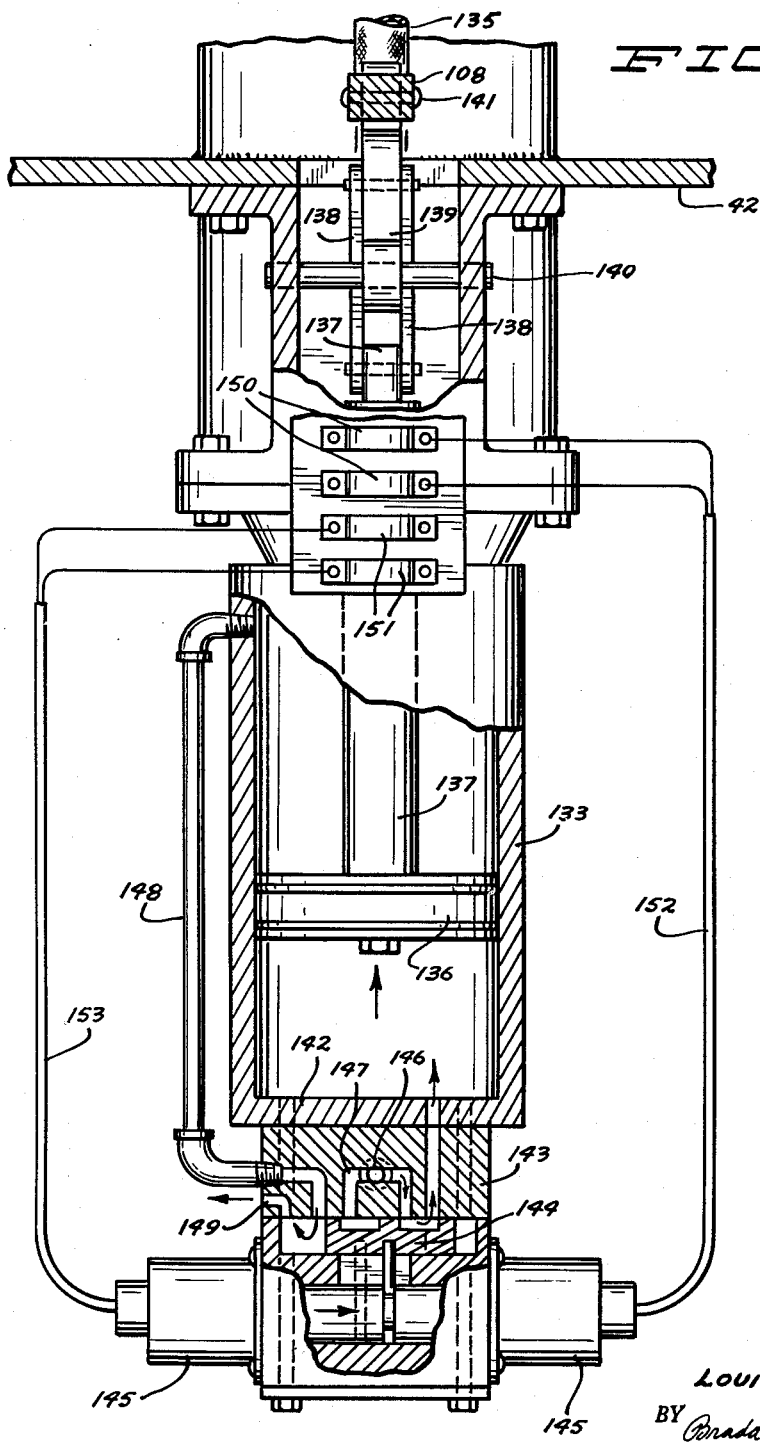
Figure 16:
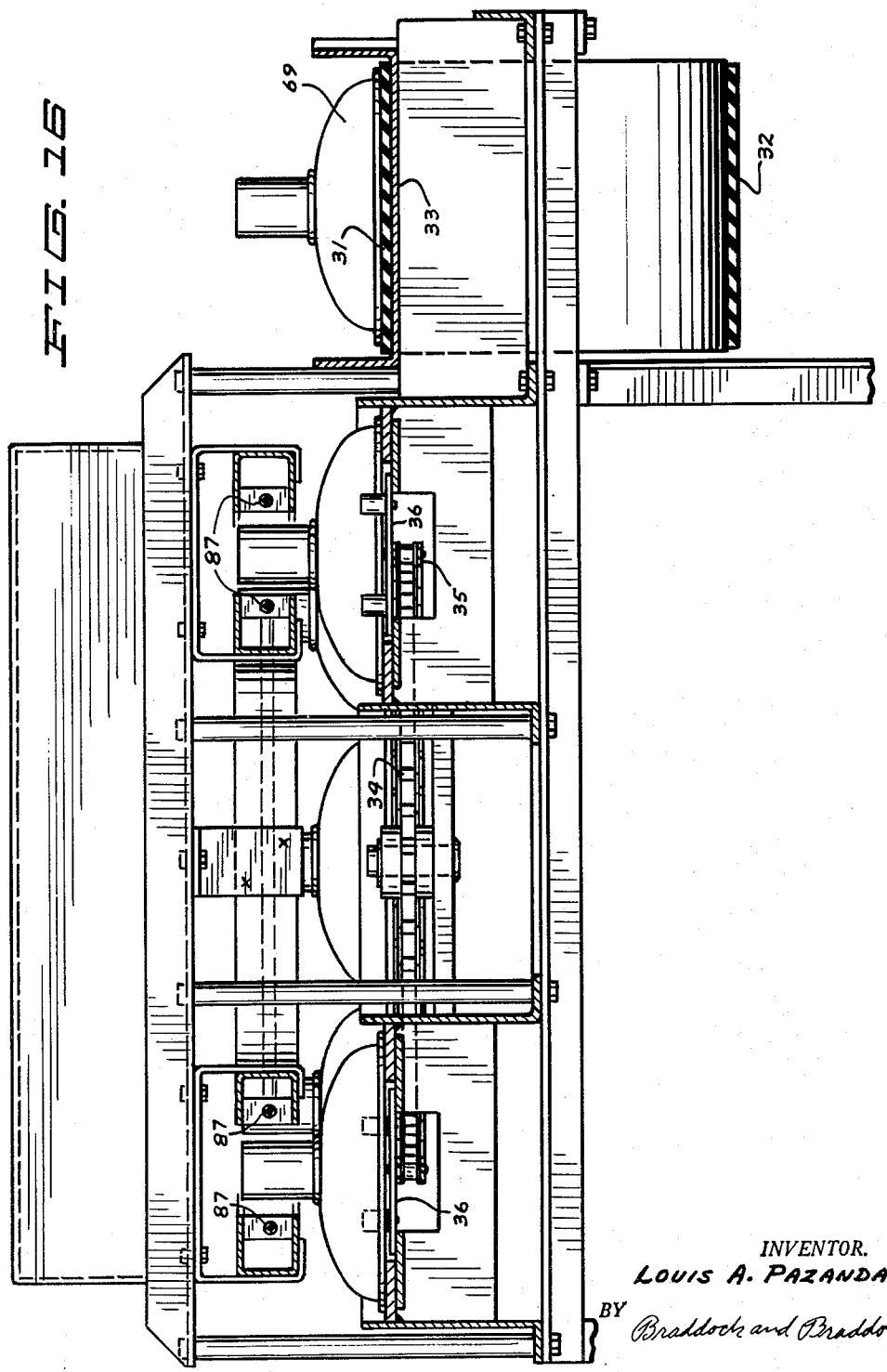
Figure 17:
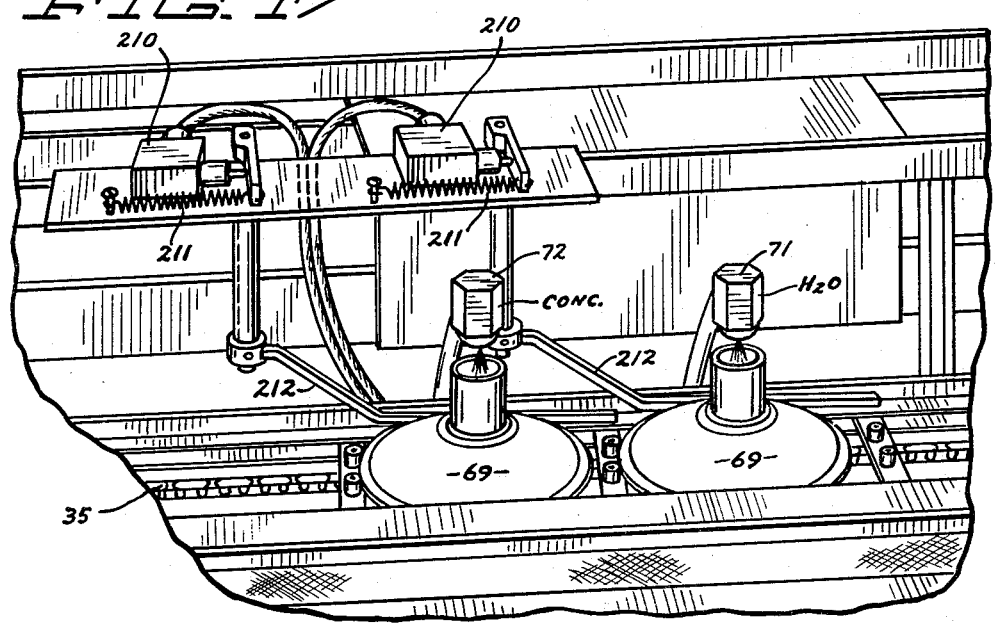
Figure 18:
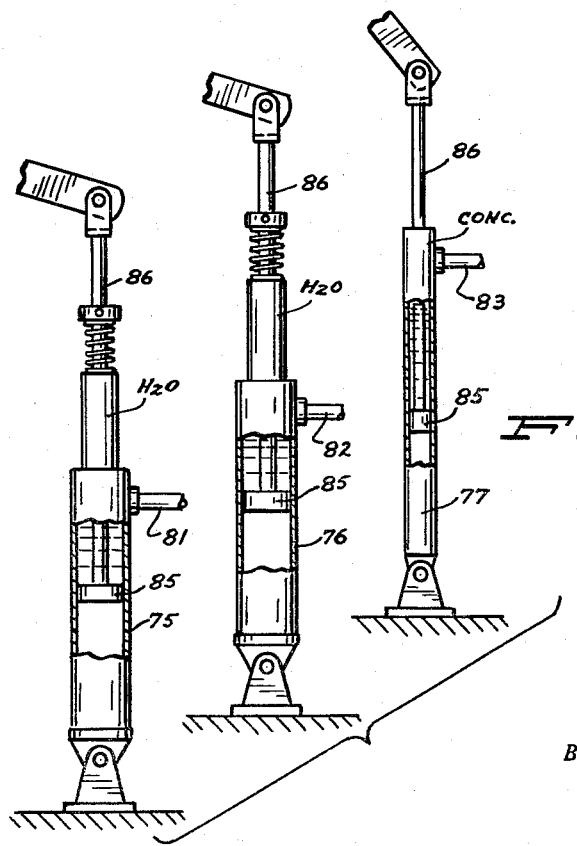
Figure 19:
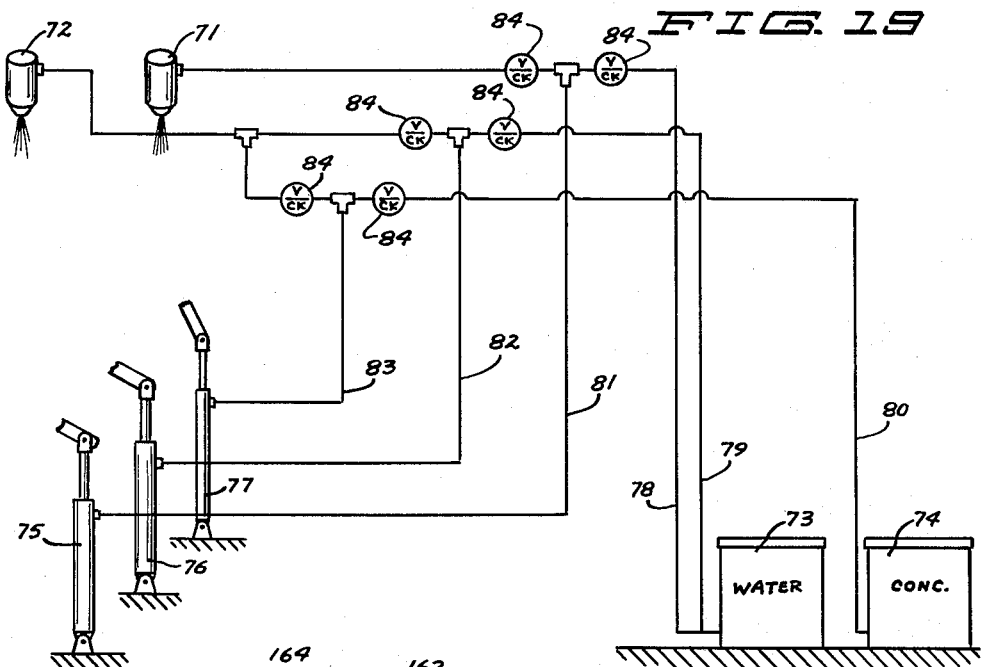
Figure 20:
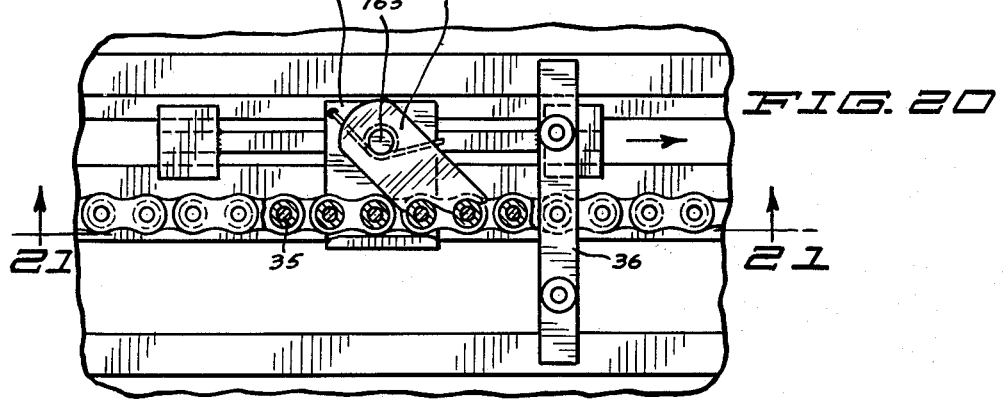
Figure 21:
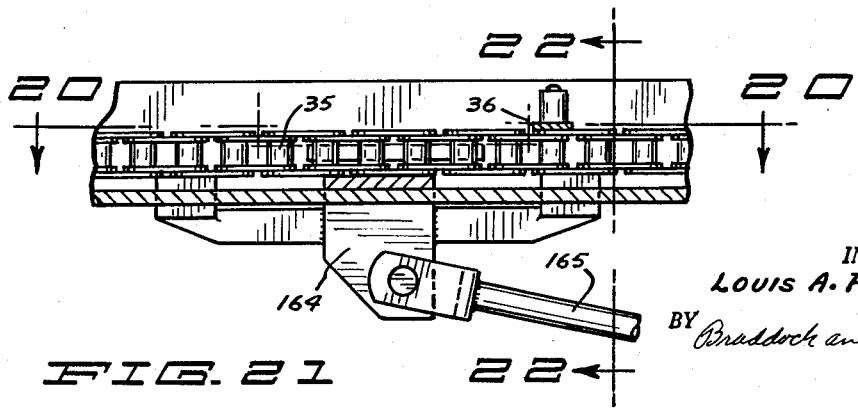

FIG. 7 is an enlarged fragmentary top plan view of a portion of the apparatus disclosing one of several duplicate constricting mechanisms of a rotatable assembly of said apparatus at an initial station of the rotatable assembly ready to receive a hollow stand with heated collar and a different one of the several duplicate constricting mechanisms of said rotatable assembly at a final station thereof ready to release a hollow stand with constricted tree from the apparatus;

FIG. 8 is a fragmentary top plan view corresponding generally with the disclosure of FIG. 7, but showing a hollow stand with heated collar rested upon the rotatable assembly within a constricting mechanism thereof at said initial station ready to be operated upon, and also showing a hollow stand as it would appear after constricted on a tree trunk and while being ejected from the apparatus;

FIG. 9 is an enlarged top plan view detailing one of the duplicate constricting mechanisms as when at the initial station, as in FIG. 8, with parts removed for the sake of clarity;

FIG. 10 is a detail sectional view, taken on line 10—10 in FIG. 9;

FIG. 11 is a fragmentary top plan view of one of said constricting mechanisms as when at a second station of the rotatable assembly in non-constricting position;

FIG. 12 is a fragmentary top plan view of one of the constricting mechanisms as when at said second station in constricting position;

FIG. 13 is a detail sectional view, taken on line 13—13 in FIG. 12;

FIG. 14 is an enlarged sectional view, taken on line 14—14 in FIG. 1 or FIG. 8;

FIG. 15 is a further enlarged sectional view, taken on line 15—15 in FIG. 14, disclosing parts in different positions;

FIG. 16 is an enlarged vertical sectional view, taken on line 16—16 in FIG. 2;

FIG. 17 is an enlarged fragmentary perspective view detailing injectors of the apparatus for charging the hollow stands with water and/or nutrient;

FIG. 18 is a diagrammatic view illustrative of mechanism including cylinders for feeding water and/or nutrient to the injectors disclosed in FIG. 17;

FIG. 19 is a schematic diagram of an hydraulic system of the apparatus including said injectors and water and nutrient feeding mechanism as parts thereof;

FIG. 20 is a detail sectional view, taken as on line 20—20 in FIG. 21 or FIG. 22, of a portion of an actuating mechanism for a hollow stand conveyor of the apparatus;

FIG. 21 is a detail sectional view, taken as on line 21—21 in FIG. 22;

FIG. 22 is a detail sectional view, taken as on line 22—22 in FIG. 21;

FIG. 23 is a bottom plan view of one of substantially duplicate resilient elements which provide cylindrical constricting members employed in the apparatus;

FIG. 24 is a right-side-up side elevational view of the resilient element disclosed in FIG. 23;

FIG. 25 is a side elevational view of a tree the trunk of which has been constricted within a collar of a hollow stand by practice of the invention; and FIG. 26 is an elevational view of one of the hollow stands as it would appear before insertion into the apparatus to be operated upon.

A frame of the machine suitably and conveniently supports longitudinally spaced horizontal pulleys 30 on which ride a first conveyor belt including upper and lower lengths, denoted 31 and 32, respectively, said upper length being ridable on an upper surface of a horizontal platform 33 rigid with said frame.

The frame also supports longitudinally spaced vertical pulleys 34, at a side of the pulleys 30, on which rides a continuous chain 35 of connected links secured to a second conveyor belt 36 itself situated between and ridable on spaced, parallel horizontal platforms. Horizontal lengths of the second conveyor belt 36, at opposite sides, respectively, of the vertical pulleys 34, are in spaced, parallel relation and in a single plane, as well as in the plane of and in parallel relation to the upper length 31 of the first conveyor belt.

Hollow stands in which trees are to be mounted are deposited, one behind another, on the upper length 31 and the first conveyor belt is to be constantly advanced, from right toward left in FIGS. 1 and 2 of the drawings, to urge the hollow stands toward a transverse surface 37 at the left end of said upper length 31. Said hollow stands are directed by a guideway 38 toward said transverse surface to a position contiguous with a passageway 39 leading to the second conveyor belt 36, and the hollow stands are to be intermittently conveyed, one by one at equally spaced intervals and in a manner to be set forth, through said passageway onto an adjacent portion of a length of the second conveyor belt toward the left of said length in said FIGS. 1 and 2.

The second conveyor belt 36 and hollow stands deposited thereon are to be advanced, in counterclockwise direction in FIGS. 1 and 2, at equally spaced intervals the same as the equally spaced intervals at which the different hollow stands are deposited on said second conveyor belt, in a manner also to be set forth, so that said hollow stands will be moved, in equally spaced relation, with the spaced lengths of the second conveyor belt to locations where bodies thereof are to be supplied with water and/or liquid plant food and collars of the hollow stands, on the bodies, are to be heated to an extent rendering them capable of being readily and easily deformable by pressure.

A rotatable assembly 40 of the apparatus, adjacent to the left end of the second conveyor belt 36 in FIGS. 1 and 2, is suitably and conveniently mounted on the frame for rotation of a head portion 42 thereof in a horizontal plane and in counterclockwise direction. The head portion has thereon equally circumferentially spaced constricting mechanisms 43 which are equally radially spaced from its axis. A guideway 44 leads from the left end portion of the delivery length of the second conveyor belt 36, at a side of the frame opposite the upper length 31 of the first conveyor belt, to position above an adjacent part of the head portion of the rotatable assembly, and the hollow stands are to be intermittently conveyed, one by one and at the same spaced intervals as hollow stands are conveyed onto the second conveyor belt from the upper length 31 of the first conveyor belt, through the guideway 44 onto said head portion to position within a constricting mechanism 43 at the time at an initial station 45 to which said constricting mechanisms, respectively, are to be intermittently and successively rotated. The initial station 45 is adjacent to the guideway 44. Second, third, fourth and fifth stations to which each constricting mechanism 43 is to be intermittently and successively moved, with rotation ahead of the assembly 40, are represented 46, 47, 48 and 49, respectively, and a final station, where each assembled hollow stand-tree is to be released from the apparatus in a manner to be explained, is indicated 50. An outlet way from the final station 50 is denoted 51.

The different constricting mechanisms 43 are to be successively advanced to the different stations in response to step by step rotational advancement, in counterclockwise direction in FIGS. 1 and 2, of the head portion 42 of the assembly 40. As disclosed in FIGS. 3 and 4 a peripheral lower surface of said head portion rides on circumferentially spaced rollers 52 supported by and between a double ring 53 itself rigid with the frame of the apparatus. A vertical arm 54 is to be forcibly reciprocated toward left and right in FIGS. 2 and 3 to cause the head portion to be rotatably advanced step by step. The vertical arm 54 is rigid with a slide member 55 mounted for reciprocal movement on the frame. A pawl 56, pivotally supported, as at 57, on the slide member 55 is to be successively engageable with each of equally circumferentially spaced actuator and stop pins 58 extending downwardly from the head portion, there being a pin 58 disposed exteriorly of, in spaced relation to and radially alined with each of the constricting mechanisms. The construction and arrangement will be such that when the vertical arm 54 with slide member 55 is forcibly moved toward the left in FIGS. 2, 3 and 5, the pawl 56 will be released from a preceding pin 58 with which engaged and become engaged back of the next adjacent succeeding pin, and when said vertical arm with slide member is forcibly moved toward the right the pawl will cause the head portion 42 to become rotatably advanced one step.

As will be clear from the disclosure of FIG. 3, the pins 58 also function as stops for locating the constricting mechanisms at each of the different stations. An intermediate portion of a first lever is pivotally mounted, as at 59, on the frame. An inner arm 60 of said first lever normally is situated in engaged relation with one of said pins to arrest its rotational advancement, and an outer arm 61 of said first lever is pivoted to an adjacent end of a link 62 the opposite end of which is pivoted to an inner arm 63 of a second lever having an intermediate portion thereof pivoted, as at 64, on said frame. An elongated lever 65 has one of its ends pivoted, as at 66, on the frame for inward and outward swinging movement of said elongated lever. An intermediate portion of the lever 65 is assembled with an outer arm 67 of the second lever in such manner as to cause the first lever to be swung on the pivot 59 in response to inward and outward swinging movement of said lever 65. A free end portion of the lever 65, opposite the pivot 66, is longitudinally alined with the slide member 55 adjacent to the end thereof opposite the vertical arm 54. A tension coil spring 68, attached to the lever 65 and to the frame, normally retains said lever 65 at an inner position and resultantly retains the inner arm 60 in position where engaged by a pin 58, as in FIG. 3, to arrest rotational advancement of the head portion 42 of the assembly 40. Forcible movement of the vertical arm 54 with slide member 55 to the left in FIGS. 2, 3 and 5 will cause the slide member 55 to swing the lever 65 outwardly, thus to swing the inner arm 60 of the first lever outwardly to be clear of and release the pin by which it was engaged, as well as cause the pawl 56 to be released from a preceding pin and engage the next adjacent succeeding pin, and forcible movement of said vertical arm with slide to the right will permit the lever 65 to be swung inwardly by the tension coil spring 68 thus to return the inner arm 60 of the first lever to its normal position where to be in arresting relation to advancement of the next adjacent succeeding pin, as well as to cause said pawl to rotatably advance said head portion. Clearly, inward swinging of the lever 65 will be under the control of the slide member 55 and the inner arm of said first lever will be in arresting relation to the advancing next adjacent succeeding pin before it reaches the location of said inner arm.

In FIG. 26 of the drawings there is disclosed a hollow stand of character to be constricted onto a tree trunk according to principles of the invention. Said stand includes a hollow body 69 of metal and a cylindrical collar 70 projecting upwardly from the hollow body. Save for an opening through the collar the hollow stand is fluid-tight.

Each hollow stand deposited on the second conveyor belt 36 is to be conveyed first to a station or stations where a metered quantity of water and/or nutrient are to be fed into the hollow body thereof and thence through an elongated heater in which the collars of the stands are heated to be rendered capable of being readily and easily deformable by and under pressure.

Injectors 71 and 72 of the apparatus for charging the hollow stands with water and nutrient are disclosed in FIG. 17 of the drawings, FIG. 18 shows mechanisms for feeding liquid, water and/or plant food, to the injectors, and FIG. 19 discloses an hydraulic system of the apparatus in which said injectors and mechanism are included.

The hydraulic system includes a tank 73 for water and a tank 74 for liquid concentrate, nutrient or plant food. The mechanism for feeding liquid to the injectors includes cylinders 75, 76 and 77. Connections for flow of liquid in the system are as follows: 78 leads from the water tank 73 to the injector 71; 79 is from said water tank to the injector 72; 80 is from the concentrate tank 74 to the injector 72; 81 is from 78 to the cylinder 75; 82 is from 79 to the cylinder 76; and 83 is from 80 to the cylinder 77. Check valves, each denoted 84, in the several connections between 81, 82, 83 and the tanks 73 and 74 and the injectors 71 and 72, are for permitting flow from said tanks to the cylinders 75, 76 and 77 and from said cylinders to said injectors and preventing flow from the cylinders back to the tanks.

Pistons 85, each with connecting rod 86, are for the purpose of drawing or sucking liquid from the tanks 73 and 74 into the cylinders 75, 76 and 77 and for forcing withdrawn liquid to the injectors 71 and 72. The connections to the cylinders are above the pistons. Liquid is to be drawn or sucked into the cylinders in response to downward movement of the pistons and forced into the injectors in response to upward movement of said pistons.

Hollow stands of character to be constricted on tree trunks are disclosed in FIG. 16 of the drawings as when enroute past and through heating elements, each designated 87, of an elongated heater of the apparatus. As shown, the hollow stands are to be heated by electrical means which can be continuously energized during operation of the apparatus and practice of the method.

The constricting mechanisms 43 are of duplicate construction. Description of one will suffice for description of all.

With respect to the disclosure of FIGS. 7 to 13, inclusive, of the drawings, 88 denotes exterior part-cylindrical complemental jaws of each of the constricting mechanisms suitably and conveniently mounted on the head portion 42 of the rotatable assembly 40 for movement toward and away from each other and 89 indicates interior part-cylindrical complemental jaws, each of arc less than that of the corresponding exterior jaw 88, assembled with said exterior jaws, respectively, and rotatably slidable relative to their internal surfaces. Each of the interior jaws 89 pivotally supports, as at 90, an exterior end of an inwardly extending link 91 and an interior end of each link is pivotally connected, as at 92, to a clamping element 93. There are three duplicate links, each supporting a clamping element, extending inwardly from each interior jaw 89 which are equally spaced, at about 60 degrees as shown, and the clamping elements 93 are of duplicate construction and guided for inward and outward radial movement while retained in equally spaced relation.

Each of the clamping elements 93 on the inwardly extending links 91 pivoted to each interior jaw 89 more or less loosely supports, as at 94, a rubber head 95, of construction as hereinafter to be described.

The rubber heads 95 are at the interior ends of said clamping elements and in diametrically opposed relation to each other to be forcibly grasped upon and in surrounding relation to collars, such as 70, when to be constricted on tree trunks. The construction and arrangement will be such that the rubber heads 95 will in cooperation with each other forcibly contact the outer periphery of each collar at a plurality of locations, six as shown, equally spaced about said outer periphery.

Each constricting mechanism 43 incorporates first devices, actuable when the constricting mechanism is at the initial station 45, to move the exterior jaws 88, with appurtenances including the rubber heads 95, toward each other and actuable when said constricting mechanism is at the final station 50 to release said exterior jaws, and second devices, actuable when the constricting mechanism is at the second station 46, to cause the rubber heads to be forced inwardly to pressingly engage the collars. Stated differently, the rubber heads are to be moved inwardly at the initial station 45 to position where in adjacent relation to the collars by first devices which after actuated will preclude movement of the exterior jaws away from each other, the trunks of trees are to be placed in the collars of the hollow stands at the second station 46, the second devices are to be actuated at said second station after the tree trunks are inserted to cause the rubber heads 95 to be forced interiorly against the collars without affecting the capacity of the first devices to preclude movement of said exterior jaws apart, the rubber heads are to remain sealingly grasped on the collars of the hollow stands while at and passing the cooling stations 47, 48 and 49, and said rubber heads are to be released from said collars at the final station 50.

The first devices are operative selectively to move the exterior jaws 88 inwardly, thus to move the rubber heads into adjacent relation to the collars of the hollow stands, and outwardly, thus to release the rubber heads for outward movement.

Intermediate portions of intermeshing gear quadrants 96 of the first devices of each constricting mechanism are rotatably mounted, as at 97, on the head portion 42 of the assembly 40 for rotation in a horizontal plane. Exterior end portions of the gear quadrants are pivotally secured, as by pins 98, to elongated bars 99 rigid with guides 100 slidably mounted on opposed external marginal portions of the exterior jaws 88, respectively, in adjacent relation to rollers 101 on said exterior jaws and disposed outwardly thereof. Rollers 102 mounted, as at 103 in FIG. 10, on said head portion of said assembly are disposed exteriorly of the rollers 101, respectively, in adjacent relation thereto. Each elongated bar 99 supports an inwardly pointing V-shape wedge 104 on the end thereof opposite the corresponding gear quadrant 96.

The several elements of the first devices for moving the exterior jaws 88 inwardly and outwardly are disclosed in FIG. 9 as when in position where retaining said exterior jaws at their outermost positions. Converging curvilinear surfaces of the guides 100, respectively, are retaining the sets, respectively, of rollers 101, 102 and 101, 102 in proximity to each other. Said first devices are disclosed in FIGS. 11 and 12 as when in position to retain the exterior jaws at an inner position. The V-shape wedges 104 on the elongated bars 99 are retaining the sets of rollers 101, 102 and 101, 102 in spaced relation with said rollers 101 closer to the central portion of the corresponding constricting mechanism than in FIG. 9. It will be apparent that the exterior jaws 88 are to be moved toward each other in response to rotation of the intermeshing portions of the gear quadrants 96 toward the left and away from each other in response to rotation of said intermeshing portions toward the right in FIGS. 9, 11 and 12. It also will be apparent that said gear guadrants with appurtenances when situated as in said FIGS. 11 and 12 will retain said exterior jaws at their inner positions unless and until the intermeshing portions of the gear quadrants are forcibly rotated toward the left. Upon return of the guides 100 from their positions as in FIGS. 11 and 12 to their positions as in FIG. 9, the converging curvilinear surfaces of said guides, respectively, will cause the roller 101 to be moved toward the rollers 102 thus to move the exterior jaws apart.

The second devices are operative selectively to rotate the interior jaws 89 relative to the exterior jaws 88 from positions as in FIGS. 9 and 11 where the inwardly extending links 91 are out of radial alinement to positions as in FIG. 12 where said inwardly extending links are in radial alinement with the rubber heads 95, thus to cause said rubber heads to be forcibly grasped on the collars of the hollow stands, and to rotate the interior jaws back to positions as in said FIGS. 9 and 11 where said inwardly extending links are out of radial alinement with said rubber heads, thus to release the rubber heads from said collars.

Pull rods 105 of the second devices pivoted, as at 106, to intermediate portions of the interior jaws 89 of each constricting mechanism converge in direction interiorly of the head portion 42 of the assembly 40 and are pivotally connected, as at 107, side by side to the outer end portion of an actuator piece 108 extending radially inwardly of said head portion. Tension coil springs 109 are connected between intermediate portions of the pull rods 105 and the exterior jaws 88, respectively. The interior jaws 89 are to be rotated from their positions as in FIGS. 9 and 11 to their positions as in FIG. 12 in response to forcible movement of the actuator piece 108 toward the left, and back to their positions as in said FIGS. 9 and 11 by the tension coil springs 109 when said actuator piece is released.

As hereinbefore stated the first devices are actuable to move the exterior jaws 88 toward each other when each constricting mechanism is at the initial station 45 of the rotatable assembly and to move said exterior jaws apart when each constricting mechanism is at the final station 50 of said rotatable assembly. Means for actuating said first devices to move the exterior jaws toward and away from each other are clearly disclosed in FIGS. 7 and 8 of the drawings.

A lever 110 has a central portion thereof pivotally secured, as at 111, on the frame at a location in radial alinement with and disposed interiorly of the initial station 45. One end of the lever 110 is pivoted, as at 112, to an intermediate portion of a push bar 113 and the other end of said lever is pivoted, as at 114, to the interior end of a first actuator rod 115 which extends in a horizontal plane radially outwardly of and to position beyond said head portion. The push bar 113 is rigid with a tension coil spring 116 secured to the frame, as at 117, and the end 118 of said push bar is to be alined and engageable with one of the pins 98, pivotally connecting the gear quadrants 96 and the elongated bars 99, of the constricting mechanism at the time at said initial station 45. The first actuator rod 115 is to be moved to the right in FIGS. 7 and 8 to rotate the gear quadrants 96 from the position in which shown in FIG. 9 to the position in which shown in FIGS. 11 and 12, and the tension coil spring 116 is to return the first actuator rod and the push bar 113 to their normal positions upon release of said first actuator rod.

A lever 119, disposed interiorly of the lever 110, has an intermediate portion thereof pivotally secured, as at 120, on the frame in radial alinement with said lever 110. One end of the lever 119 is pivoted, as at 121, to an end of an actuator strip 122 secured to a tension coil spring 123 itself connected, as at 124, to the frame. The other end of the lever 119 is pivoted, as at 125, to the inner end of a push bar 126. An intermediate portion of the push bar 126 is pivotally connected, as at 127, to the interior end of a second actuator rod 128 which extends in a horizontal plane radially outwardly of and to position beyond the head portion 42 of the rotatable assembly 40. A small tension coil spring 129, secured between the second actuator rod 128 and the push bar 126 normally retains said second actuator rod and push bar in longitudinal alinement, as well as in alinement with the pivot 125. The end 130 of the push bar 126 is to be alined and engageable with one of the pins 98 of the constricting mechanism at the time at the final station 50. The second actuator rod 128 is to be moved to the right in FIGS. 7 and 8 to rotate the gear quadrants 96 from the position in which shown in FIGS. 11 and 12 to the position in which shown in FIG. 9, and the tension coil springs 123 and 129 are adapted to return the second actuator rod and the push bar 126 to their normal positions upon release of said second actuator rod. The push bar 126 is adapted to ride off of the corresponding pivot pin 98 upon completion of rotation of the gear quadrants to the position in which shown at the final station 50 in FIG. 8, and the small tension coil spring 129 is adapted to return said push bar and the second actuator rod 128 to longitudinal alinement.

The second devices are actuable to cause the rubber heads 95 to be forced inwardly to graspingly engage the collars when each constricting mechanism is at the second station 46 of the rotatable assembly and to release said rubber heads when each constricting mechanism is at the final station 50. Means for actuating said second devices to rotate the interior jaws 89 relative to the exterior jaws 88 thus selectively to radially aline the inwardly extending links 91 with the clamping elements 93 and the rubber heads 95 and to move said links out of radial alinement are disclosed in FIGS. 3, 7, 8, 9, 11, 12, 14 and 15.

In FIGS. 3 and 14 there is disclosed a hollow upright 131 rotatably supporting, as at 132, a central part of the head portion 42 of the assembly 40. Equally circumferentially spaced vertical cylinders 133 are supported beneath and rotatable with said head portion. There are six of the vertical cylinders 133 disposed interiorly of and in spaced radial alinement with the constricting mechanisms 43, respectively, on the head portion 42. An incoming connection 134 leads from a source (not shown) of air under pressure into the lower end of the hollow upright 131 and flexible hoses 135 lead from the upper end of a tubular member, constituted as a part of said hollow upright and rotatable with said head portion, to the vertical cylinders 133, respectively. Pistons 136 in said vertical cylinders, one disclosed in FIG. 15, are rigid with upwardly extending stems 137. Each stem 137 is pivotally connected to an upwardly extending link 138 and said links are pivotally connected to the midlengths of substantially L-shape levers 139. One end of each L-shape lever is rotatably supported, as at 140, on the rotatable assembly at a location beneath the head portion and above the corresponding cylinder 133, and the opposite end of each L-shape lever is pivotally connected, as at 141, to the inner end of a corresponding one of the actuator pieces 108. Said actuator pieces are to be forced interiorly in response to depression of the pistons 136 in the vertical cylinders 133 and moved exteriorly in response to elevation of said pistons in said vertical cylinders.

Each of the cylinders 133 is closed at its lower end by an end wall 142 and each of said end walls supports a fitting 143 as disclosed in FIGS. 14 and 15. Each fitting supports a valve construction constituted as a casing having a horizontally slidable valve 144 therein actuable, toward right and left in said FIG. 15, by solenoids 145 at either end of said casing. The flexible hoses 135 enter the fittings 143, respectively, at locations denoted 146, and passageways 147 in each fitting lead by way of the corresponding casing to and are controlled by the slidable valve therein. A pipe 148 connects an upper portion of each cylinder, above the piston, with an outlet 149 from the corresponding fitting. The construction and arrangement will be such that when the solenoid at the right in FIG. 15 is energized there will be communication between the upper portion of the cylinder above the piston and atmosphere with the passageways 147 open to the lower portion of said cylinder below said piston, and when the solenoid at the left in said FIG. 15 is energized there will be communication between the passageways 147 and said upper portion of the cylinder above the piston with said lower portion of said cylinder open to atmosphere.

Upper and lower sets, indicated 150 and 151, of brush type contact elements are secured to external surfaces of the rotatable assembly in equally spaced circumferential relation and there is an upper and a lower set, in vertical alinement, corresponding to each of the cylinders 133 disposed exteriorly thereof. Lead wires 152 extend from the upper sets 150 to the solenoids to be energized to cause the corresponding pistons to be elevated and lead wires 153 extend from the lower sets 151 to the solenoids to be energized to cause the corresponding pistons to be depressed.

The frame of the apparatus fixedly supports a lower set of contact elements 154, at the second station 46, to be engaged by each lower set 151 of brush contact elements when at said second station, and an upper set of contact elements 155, at the final station 50, to be engaged by each upper set 150 of brush contact elements when at said final station. See FIGS. 3 and 14.

FIGS. 2 and 6 of the drawings disclose an electric motor 156 on the frame of the apparatus for actuating entities thereof, as well as for operating linkages, levers, etc. of said apparatus which are diagrammatically shown in said FIG. 6.

A chain 157 riding a sprocket 158 on the shaft of the electric motor 156 also rides a sprocket 159 fixed on a transverse shaft 160 mounted on the frame, and a chain 161 riding a sprocket fixed on the transverse shaft 160 also rides a sprocket fixed on the adjacent horizontal pulley 30 thus to cause the first conveyor belt having the upper and lower lengths 31 and 32 to be constantly driven in response to operation of the electric motor.

The second conveyor belt 36 is to be advanced, step by step as hereinbefore set forth, through the instrumentality of mechanism, disclosed in FIGS. 1, 20, 21 and 22, to be actuated by the electric motor. A pawl 162 of said mechanism is pivotally mounted, at 163, on a member 164 slidable on the frame and resiliently urged to engage links of the continuous chain 35. A conveyor rod 165 pivoted to a projection on the member 164 is movable to the left in said FIG. 1 to cause the pawl to advance said second conveyor belt and to the right to release said pawl from and cause it to be ridable over the chain links. The conveyor rod 165 is reciprocated in response to actuation of the electric motor 156 through the instrumentality of a disc 166 fixed on the transverse shaft 160, a link 167 having one of its ends pivoted to a marginal portion of said disc and its opposite end pivoted to the extremity of an arm 168 rigid with and extending downwardly from a cross shaft 169 and an arm 170 rigid with and extending downwardly from said cross shaft and having its lower end pivoted, as at 171, to the adjacent end of said conveyor rod.

The manner in which the hollow stands are to be intermittently conveyed one by one through the passageway 39 onto the second conveyor belt 36 and through the guideway 44 onto the head portion 42 of the rotatable assembly will be clear from the disclosures of FIGS. 1, 2, 6, 7 and 8.

A first L-lever for conveying the hollow stands onto said second conveyor belt is constituted as a support arm 172 having an intermediate portion thereof fixed on an upper end portion of a vertical stub shaft 173 and an actuator arm 174 to be ridable inwardly and outwardly of the passageway 39. The actuator arm 174 includes an inwardly facing surface for engagement with the collar of each hollow stand to push it onto the second conveyor belt 36 and an elongated exteriorly facing surface 175 for holding back the next adjacent hollow stand when said actuator arm 174 is at its intermost position as in FIGS. 1 and 8.

A second L-lever for conveying the hollow stands off of the second conveyor belt consists of a support arm 176 having an end thereof fixed on an upper end of a vertical stub shaft 177 and an actuator arm 178 to be ridable inwardly and outwardly of the guideway 44. The actuator arm 178 includes an inwardly facing surface for engagement with the hollow body of each stand to push it onto the head portion of the rotatable assembly.

The first and second L-levers are above the frame and the vertical stub shafts 173 and 177 extend downwardly to an open space within the frame, as disclosed in FIG. 2. The lower end of the vertical stub shaft 173 fixedly supports, as at 179, an intermediate portion of a horizontal L-lever including an arm 180 at the side thereof opposite the actuator arm 174, and the lower end of the vertical stub shaft 177 fixedly supports a horizontal arm 181 at the side thereof adjacent to the actuator arm 178. A transverse link 182 has one of its ends pivotally connected, as at 183, to an outer end portion of the arm 180 of the L-lever fixed on the vertical stub shaft 173 and its opposite end pivotally connected, as at 184, to an outer end portion of the arm 181 fixed to the vertical stub shaft 177. An arm 185 of the L-lever, substantially perpendicular to the arm 180, is pivotally connected, as at 186, to an end of a link 187 the opposite end of which is pivotally connected, as at 188, to an upwardly extending leg 189 of an L-lever having an intermediate portion thereof mounted for rotatable movement on a horizontal shaft 190 supported on the frame in parallel relation to the transverse shaft 160. The L-lever having the upwardly extending leg 189 has a leg 191 supporting a roller 192 engageable with the periphery of a cam 193 fixed on said transverse shaft 160. The construction and arrangement will be such that rotation of the cam 193 will cause the actuator arms 174 and 178 of the first and second L-levers, respectively, to be alternately simultaneously swung inwardly and outwardly.

Mechanism for forcing the pistons 85 downwardly in the cylinders 75, 76 and 77 to cause liquid to be drawn or sucked into said cylinders and for forcing said pistons upwardly in the cylinders to cause liquid to be forced into the injectors is disclosed in FIGS. 2, 6, 17, 18 and 19.

A horizontal stub shaft 194, disclosed in FIGS. 2 and 6, is rotatably mounted on the frame and fixedly supports intermediate portions of L-levers including horizontal arms 195 and vertical arms 196. The outer ends of the arms 195 are pivotally connected, as at 197, to the upper ends of two of the connecting rods 86 and the lower ends of the arms 196 are interconnected by a cross pin 198. An arm 199 rigid with the stub shaft 194 is pivotally connected with the third of said connecting rods.

An elongated actuator 200, for oscillating the vertical arms 196 in a vertical plane, has an end portion thereof pivotally connected, as at 201, to the lower end of a downwardly extending arm 202 rigid with the cross shaft 169, and lower edges of opposite end portions of parallel double bars of said actuator are provided with transversely alined notches 203 for engagement with the cross pin 198.

Oscillatable movement of the cross shaft 169, in response to actuation of the electric motor and causing the conveyor rod 165 to be reciprocated, will also cause the elongated actuator 200 to be reciprocated thus to cause the cross pin 198, when engaged in the notches 203, to be moved back and forth, rotate the stub shaft 194 and vertically reciprocate the connecting rods 86 with pistons 85.

It will be apparent that the injectors 71 and 72 should be operative to force liquid into the hollow bodies of the stands only when they are present to receive the liquid. Means is included for precluding depression of the connection rods 86 in any instances when there may not be hollow stands at the locations of the injectors where to receive liquid.

Armatures of solenoids 204 on the frame are pivotally connected, as at 205, to arms 206 rigid with a rotatably mounted shaft 207 to which arms 208, alined with the arms 206, also are secured. A lift pin 209 interconnecting the outer ends of the arms 208 is below and in adjacent relation to intermediate portions of the double bars of the elongated actuator 200.

Electric switches 210, for controlling circuits including the solenoids, normally are held closed by tension coil springs 211 to retain the solenoids 204 energized thus to cause the elongated actuator 200 to be at an elevated position where the cross pin 198 is below and not engaged in the notches 203. Switch opening elements 212, in the path of travel of the hollow bodies of the stands, are to be pushed to one side by said stands, as in FIG. 17, as they reach the locations where to receive liquid, thus to cause the switches to be opened and the solenoids to be de-energized. Inasmuch as the switches are opened and the solenoids are de-energized only in response to pushing aside the elements 212, it will be obvious that the injectors will be operative to cause liquid to be dispelled only when hollow stands are present to receive the liquid. In FIG. 6 of the drawings the elongated actuator 200 is shown in its elevated position as when the solenoids are energized and the notches 203 are above the elevation of the cross pin 198. It will be apparent that the solenoids 204 could be employed individually to prevent flow of liquid from the injectors 71 and 72, merely by duplication of parts. That is, solenoid controls of flow from the injectors, while for convenience disclosed as operative in a single system to prevent flow from both injectors, could be operative in dual systems to prevent flow from each of the injectors. Stated differently, two different systems, each equivalent to the system as illustrated and described, could be employed, one of said systems to be operative to prevent flow from the injector 71 and the other to be operative to prevent flow from the injector 72.

The head portion 42 of the assembly 40 is to be rotatably advanced, step by step as hereinbefore described, by a link 246 pivoted to the sprocket 159, as at 247 and to an elongated lever 248, as at 249, itself connected with the vertical arm 54.

The outer end of the first actuator rod 115 for closing the exterior jaws 88 is pivotally connected, as at 213, to the upper end of an upright lever 214 having an intermediate portion thereof fixed on the cross shaft 169 and a lower end of said upright lever is pivotally connected, as at 215, to a link 216 in parallel relation to the first actuator rod. The end of the link 216 opposite the upright lever 214 is pivotally connected, as at 217, to an upper end portion of an upright actuator lever 218 the lower end of which is pivotally connected, as at 219, to the frame. A shoulder 220 at the upper margin of the actuator lever 218 facing toward the upright lever 214 is to be engaged by a forwardly facing shoulder 221 on a disc 222 fixed on the transverse shaft 160 to rotate therewith. During each rotation of said transverse shaft with disc 222 the first actuator arm 115 is moved longitudinally a predetermined and fixed distance in the direction of the arrow in FIG. 6 and then released.

The outer end of the second actuator rod 123 for opening the exterior jaws 88 is pivotally connected, as at 223, to the upper end of an upright lever 224 having an intermediate portion thereof fixed on the cross shaft 169 and a lower end of said upright lever is pivotally connected, as at 225, to a link 226 in parallel relation to the second actuator rod. The end of the link 226 opposite the upright lever 224 is pivotally connected, as at 227, to an upper end portion of an upright actuator lever 228 the lower end of which is pivotally connected, as at 229, to the frame. A shoulder 230 at the upper margin of the actuator lever 228 facing toward the upright lever 224 is to be engaged by a forwardly facing surface 231 on a disc 232 fixed on the transverse shaft 160 to rotate therewith. During each rotation of said transverse shaft with disc 232 the second actuator arm 128 is moved longitudinally a predetermined and fixed distance in the direction of the arrow in FIG. 6 and then released.

The disc 166 fixed on the transverse shaft 160 includes a peripheral cam 233 for closing an electric switch 234 for energizing a circuit including the lower set 154 of contact elements at the second station 46 where the rubber heads 95 are to be grasped upon the collars of the hollow stands. The construction and arrangement will be such that the cam 233 will cause the electric switch 234 to be closed by what may be termed a delayed action. Stated otherwise, the cam 233 is to reach the electric switch 234 during rotation ahead of the disc 166 an interval of time after each hollow stand has reached the second station 46, thus to afford time during which an attendant can insert a tree trunk in each hollow stand while at said second station and before the collar of the stand is constricted on the tree trunk.

Said disc 166 also includes a second peripheral cam 235 for closing an electric switch 236 for energizing a circuit including the upper set 155 of contact elements at the final station 50 where said rubber heads are to be released from the collars and removed from the hollow bodies of the stands. The construction and arrangement desirable will be such that the cam 235 will cause the electric switch 236 to be closed without delay when each hollow stand has reached the final station, thus to make it possible to accomplish removal of each assembled hollow stand-tree trunk from the apparatus immediately upon arrival at said final station.

FIGS. 1, 6, 7 and 8 disclose means for readily removing each combined hollow stand-tree from the apparatus when it shall have arrived at the final station 50 and been released. An extension 237 of the support arm 172 of the first L-lever, at the side of the vertical stub shaft 173 opposite the actuator arm 174, pivotally supports, as at 238, one end of a short link 239 having its opposite end pivotally connected, as at 240, to a pusher block 241 swingable inwardly and outwardly above the outlet way 51 from said final station. The extension 237 with pusher block 241 will swing inwardly as the actuator arm 174 is swung outwardly, and vice versa, said pusher block will be situated inwardly of trees at the final station when said actuator arm is at its outer position, as in FIG. 7 of the drawings, and the pusher block will displace each combined hollow stand-tree when released from said final station, as will be evident from the disclosure of FIG. 8.

It will be clear from the drawings and description that hollow stands are to be placed on and removed from the second conveyor belt 36 simultaneously and that a combined hollow stand-tree is to be removed from the final station 50 of the apparatus concurrently with the placing of each hollow stand on and removal of each hollow stand from said second conveyor belt. Also it will be clear that there will be removal of a combined hollow stand-tree from the final station 50 concurrently with the placing of each hollow stand at the initial station 45, as well as release of a combined hollow stand-tree at said final station substantially concurrently with the constricting of each collar on a tree at the second station 46.

Tree trunks are of non-uniform cross section ordinarily tapering from a relatively large butt to a comparatively smaller peak, as shown in FIG. 25. Rubber heads made according to the invention have been devised each to include a plurality of collar contacting elements to be substantially equally spaced around the periphery of a collar, each of said contacting elements having an interiorly facing collar engaging surface tapering outwardly and downwardly from an upper end to a lower portion thereof. The rubber heads are to be grasped on collars and tree trunks in such manner that the contacting elements of said rubber heads move along a straight path extending radially inwardly toward central longitudinal axes of the collars and tree trunks until each contacting element is exerting pressure equal to that exerted by all of the others of said contacting elements upon any collar being constricted thus to bring the collars into sealing relation to the tree trunks.

The rubber heads 95, one disclosed in FIGS. 23 and 24, are of duplicate construction. Each is constituted as a part-cylindrical body consisting of a plurality of contacting elements, three as shown, of duplicate construction. Said rubber heads will be of relatively rigid material.

The contacting elements of each rubber head desirably also may be of duplicate construction. Parallel and equally spaced cross slots 242 in the exterior periphery of each of the rubber heads are for rendering the different contacting elements thereof capable of flexing inwardly and outwardly relative to each other. An interiorly facing collar engaging surface 243 of each rubber head tapers outwardly and downwardly and is of roughened configuration. Stated differently, the exteriorly facing roughened collar engaging surfaces are constituted as parallel sets 244 of circumferentially extending bars or strips, of the same material as and integral with the rubber heads, as well as in contiguous relation to each other. The bars or strips of each set are in alined relation and the bars of the different sets are in staggered relation. The lower end portions of the interiorly facing collar engaging surfaces of the rubber heads are circumferentially cut away, as at 245, to be clear of the hollow bodies of stands when constricted on the whole of the lengths of the collars thereof.

What is claimed is:

1. An apparatus for mounting the trunks of trees in stands therefore each consisting of a hollow body having a collar thereon, comprising a frame, an injector on said frame adjacent to a location where the hollow body of each stand is to receive liquid, an assembly rigid with said frame, a head portion mounted on said assembly for rotative movement about an axis, circumferentially spaced constricting mechanisms supported on said head portion in surrounding relation to its axis adapted to be successively situated at each of initial, intermediate and final stations, means mounted with respect to said frame for conveying the stands, one by one at spaced intervals, successively first to said location and then into each of said constricting mechanisms while at said initial station, means mounted with respect to said frame for accomplishing step by step rotational advancement of said head portion at spaced intervals the same as those at which the stands, respectively, are conveyed to said location and said initial station thus to situate each stand successively at each of said initial, intermediate and final stations, and devices mounted with respect to said frame for actuating said injector when each stand is at said location to cause a quantity of liquid to be deposited into the stand, for actuating each constricting mechanism when at said intermediate station to cause the collar of each stand to be grasped upon the trunk of a tree and for actuating each constricting mechanism when at said final station to cause each stand with assembled tree to be released therefrom.

2. An apparatus for mounting the trunks of trees in stands therefore each consisting of a hollow body having a collar thereon, comprising a frame, an injector on said frame adjacent to a location where the hollow body of each stand is to receive liquid, an assembly rigid with said frame, a head portion mounted on said assembly for rotative movement about an axis, circumferentially spaced constricting mechanisms supported on said head portion in surrounding relation to its axis adapted to be successively situated at each of initial, intermediate and final stations, means mounted with respect to said frame for conveying the stands, one by one at spaced intervals, successively first to said location and then into each of said constricting mechanisms while at said initial station, means mounted with respect to said frame for accomplishing step by step rotational advancement of said head portion at spaced intervals the same as those at which the stands, respectively, are conveyed to said location and said initial station thus to situate each stand successively at each of said initial, intermediate and final stations, devices mounted with respect to said frame for actuating said injector when each stand is at said location to cause a quantity of liquid to be deposited into the stand, for actuating each constricting mechanism when at said intermediate station to cause the collar of each stand to be grasped upon the trunk of a tree and for actuating each constricting mechanism when at said final station to cause each stand with assembled tree to be released therefrom, and unitary means for actuating said devices.

3. An apparatus for mounting the trunks of trees in stands therefor, each consisting of a hollow body having a collar thereon, comprising a frame, an injector on the frame adjacent to a location where the hollow body of each stand is to receive liquid, an elongated heater on said frame, an assembly rigid with the frame, a head portion mounted on said assembly for rotative movement about an axis, equally circumferentially spaced constricting mechanisms supported on said head portion in surrounding relation to its axis adapted to be successively situated at each of initial, second, cooling and final stations, means mounted with respect to said frame for conveying the stands, one by one at spaced intervals, first to said location and said elongated heater and then into each of said constricting mechanisms while at said initial station, means mounted with respect to said frame for accomplishing step by step rotational advancement of said head portion at spaced intervals the same as those at which the stands, respectively, are conveyed to said location, elongated heater and initial station thus to situate each stand successively at each of said initial, second, cooling and final stations, and concurrently operable devices mounted with respect to said frame for actuating said injector when each stand is at said location to cause a quantity of liquid to be deposited into the stand, for actuating each constricting mechanism when at said second station to cause the collar of each stand to be grasped upon the trunk of a tree and for actuating each constricting mechanism when at said final station to cause each stand, with assembled tree, to be released therefrom and ejected from the apparatus.

4. An apparatus for mounting the trunks of trees in stands therefor each consisting of a hollow body having a collar thereon, comprising a frame, an injector on the frame adjacent to a location where the hollow body of each stand is to receive liquid, an elongated heater on said frame, an assembly rigid with the frame, a head portion mounted on said assembly for rotative movement about an axis, equally circumferentially spaced constricting mechanisms supported on said head portion in surrounding relation to its axis adapted to be successively situated at each of initial, second, cooling and final stations, means mounted with respect to said frame for conveying the stands, one by one at spaced intervals, first to said location and said elongated heater and then into each of said constricting mechanisms while at said initial station, means mounted with respect to said frame for accomplishing step by step rotational advancement of said head portion at spaced intervals the same as those at which the stands, respectively, are conveyed to said location, elongated heater and initial station thus to situate each stand successively at each of said initial, second, cooling and final stations, concurrently operable devices mounted with respect to said frame for actuating such injector when each stand is at said location to cause a quantity of liquid to be deposited into the stand, for actuating each constricting mechanism when at said second station to cause the collar of each stand to be grasped upon the trunk of a tree and for actuating each constricting mechanism when at said final station to cause each stand, with assembled tree, to be released therefrom and ejected from the apparatus, and unitary means mounted with respect to said frame for actuating said devices.

5. An apparatus for mounting the trunks of trees in stands therefor each consisting of a hollow body having a collar thereon, comprising a frame, an injector on said frame adjacent to a location where the hollow body of each stand is to receive liquid, an assembly rigid with said frame, a head portion mounted on said assembly for rotative movement about an axis, circumferentially spaced constricting mechanisms supported on said head portion in surrounding relation to its axis adapted to be successively situated at each of initial, intermediate and final stations, means mounted with respect to said frame for conveying the stands, one by one at spaced intervals, successively first to said location and then into each of said constricting mechanisms while at said initial station, means mounted with respect to said frame for accomplishing step by step rotational advancement of said head portion at spaced intervals the same as those at which the stands, respectively, are conveyed to said location and said initial station thus to situate each stand successively at each of said initial, intermediate and final stations, means mounted with respect to said frame for removing each stand with assembled tree from said final station, devices mounted with respect to said frame for actuating said injector when each stand is at said location to cause a quantity of liquid to be deposited into the stand, for actuating each constricting mechanism when at said intermediate station to cause the collar of each stand to be grasped upon the trunk of a tree, for actuating each constricting mechanism when at said final station to cause each stand with assembled tree to be released therefrom and for actuating said means for removing each stand with assembled tree from the final station after it has been released, and unitary means mounted with respect to said frame for actuating said devices.

6. The combination as specified in claim 5 wherein said means for conveying the stands to said location and into each of said constricting mechanisms while at said initial station is constituted as a constantly advanced first conveyor belt for receiving the stands, a second conveyor belt for receiving said stands one by one from said first conveyor belt and advancing them step by step to said location and said initial station, respectively, a first actuator for removing the stands one by one from said first conveyor belt and placing them on the second conveyor belt, a second actuator for removing said stands one by one from said second conveyor belt and depositing each stand into a constricting mechanism while at said initial station, and devices operable in response to actuation of said unitary means for concurrently and successively operating said first and second actuators at spaced intervals the same as those at which said stands are advanced by said second conveyor belt and said head portion is rotatively advanced.

7. In an apparatus for mounting the trunks of trees in stands therefor each consisting of a hollow body having a collar thereon, a frame, a head portion rotatably mounted with respect to said frame, circumferentially spaced constricting mechanisms, each with contacting elements, on said head portion, means mounted with respect to said frame for rotating the head portion step by step to situate each of said constricting mechanisms successively at initial, intermediate and final stations, first devices mounted with respect to said frame actuable on each constricting mechanism when at said initial station to move the contacting elements thereof inwardly toward each other, second devices mounted with respect to said frame actuable on each constricting mechanism when at said intermediate station to forcibly move the contacting elements thereof further inwardly toward each other to be pressingly engaged against a collar of a stand to cause it to be constricted upon the trunk of a tree, said first devices also being actuable when each constricting mechanism is at said final station to release the contacting elements thereof from an assembled stand-tree.

8. In an apparatus for mounting the trunks of trees in stands therefor each consisting of a hollow body having a collar thereon, a frame, a head portion rotatably mounted with respect to said frame, circumferentially spaced constricting mechanisms, each with contacting elements, on said head portion, means mounted with respect to said frame for rotating said head portion step by step to situate each of said constricting mechanisms successively at initial, second, cooling and final stations, first devices mounted with respect to said frame actuable on each constricting mechanism when at said initial station to move the contacting elements thereof inwardly toward each other, and second devices mounted with respect to said frame actuable on each constricting mechanism when at said second station to forcibly move the contacting elements thereof further inwardly toward each other to become pressingly engaged against a collar of a stand to cause it to be constricted upon the trunk of a tree and remain pressingly engaged against said collar while the constricting mechanism is being advanced step by step from said second station past the cooling stations to the final station, said first devices also being actuable when each constricting mechanism is at said final station to release the contacting elements thereof from an assembled stand-tree.

9. The combination as specified in claim 7, and means mounted with respect to said frame actuable to remove the assembled stand-trees from said constricting mechanisms after they have been released.

10. In an apparatus for mounting the trunk of a tree in a stand therefor consisting of a hollow body having a collar thereon, a frame, a constricting mechanism mounted on said frame comprising complemental part-cylindrical exterior jaws mounted for movement toward and away from each other, complemental part-cylindrical interior jaws assembled with said exterior jaws, respectively, and rotatably slidable relative to their internal surfaces, complemental contacting elements disposed interiorly of said interior jaws, respectively, and guided for inward and outward radial movement, links having outer ends thereof pivotally connected to said interior jaws, respectively, and inner ends thereof pivotally connected to said contacting elements, respectively, said links being selectively movable to first positions where out of radial alinement with the contacting elements, respectively, and second positions where radially alined with said contacting elements, respectively, first devices operable while the links are in said first positions selectively to move said exterior jaws toward each other thus to move the contacting elements into adjacent relation to the collar of a stand and outwardly thus to release said contacting elements for outward movement, and second devices operable selectively to rotate said interior jaws relative to said exterior jaws from the first to said second positions to cause the contacting elements to be pressingly engaged against said collar thus to cause it to be constricted on the trunk of a tree and from the second to said first positions thus to cause said contacting elements to be released from the collar.

11. The combination as specified in claim 10 wherein said first devices are constituted as intermeshing gear quadrants having intermediate portions thereof rotatably mounted on said frame, elongated bars pivoted to said gear quadrants, respectively, and rigid with guides slidably mounted on opposed external surfaces of the exterior jaws, respectively, first rollers on said exterior jaws, respectively, second rollers on the frame situated exteriorly of said first rollers, respectively, a wedge on each of said elongated bars at an outer side of the corresponding guide for retaining the corresponding first and second rollers in spaced relation, thus to retain the exterior jaws at an inner position, and outwardly facing, converging curvilinear surfaces on said guides, respectively, for retaining the corresponding first and second rollers in adjacent relation, thus to retain said exterior jaws at an outer position, first means for rotating the gear quadrants in one direction to cause each wedge to be situated between the corresponding first and second rollers, and second means for rotating said gear quadrants in opposite direction to cause the corresponding first and second rollers to be engaged against and retained in adjacent relation to each other by the corresponding converging curvilinear surfaces.

12. The combination as specified in claim 11 wherein each of said first and second means includes a push bar to be engaged against a portion of one of said gear quadrants at a location in spaced relation to its pivotal support, and a rod for actuating said push bar.

13. The combination as specified in claim 10 wherein said second devices are constituted as an actuator piece, pull rods pivoted to intermediate portions of said interior jaws, respectively, and converging in direction toward and pivoted to said actuator piece and tension springs connected between intermediate portions of said pull rods and said exterior jaws, respectively, and means for selectively forcibly moving said actuator piece in each of opposite directions.

14. The combination as specified in claim 13 wherein said last mentioned means includes a cylinder rigid with said frame, a piston with stem in said cylinder, an L-shape link having a first end thereof pivotally secured to said frame and a second end therof pivotally connected to said actuator piece, a link pivotally connected between said stem and an intermediate portion of said L-lever, a connecting pipe to lead from a source of fluid under pressure, a valve construction, first and second solenoids for actuating said valve construction selectively to cause fluid under pressure to enter said cylinder at a first side of the piston thus to cause the stem to be forcibly moved inwardly and at a second side of said piston thus to cause said stem to be forcibly moved outwardly, a circuit for each of said first and second solenoids, and switches for making and breaking said circuits, respectively.

15. In an apparatus for mounting a trunk of a tree in a stand therefor consisting of a hollow body having a collar thereon, a rubber head of relatively rigid material for constricting said collar on said tree trunk constituted as a part-cylindrical body consisting of a plurality of contacting elements flexible inwardly and outwardly relative to each other and having interiorly facing, circumferentially extending collar engaging surfaces tapering outwardly and downwardly from an upper to a lower portion of said rubber head, and means actuable along a straight path extending radially inwardly toward the central longitudinal axis of the collar to cause each of said contacting elements to exert pressure equal to that exerted by all of the others of the contact elements against said collar thus to force it into sealing relation with said tree trunk.

References Cited in the file of this patent

UNITED STATES PATENTS

| | | |
|---|---|---|
| 2,530,230 | Cozzoli | Nov. 14, 1950 |
| 2,698,500 | Clegg | Jan. 4, 1955 |
| 2,720,055 | Morris | Oct. 11, 1955 |
| 2,838,789 | Pazandak | June 17, 1958 |
| 2,896,381 | Lange | July 28, 1959 |